United States Patent
Nade et al.

(10) Patent No.: US 10,540,933 B2
(45) Date of Patent: Jan. 21, 2020

(54) MOBILE ELECTRONIC DEVICE, CONTROL METHOD, AND CONTROL MEDIUM

(71) Applicant: Kyocera Corporation, Kyoto (JP)

(72) Inventors: Toshiaki Nade, Yokohama (JP); Hiroko Asabu, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/937,893

(22) Filed: Mar. 28, 2018

(65) Prior Publication Data

US 2018/0286322 A1    Oct. 4, 2018

(30) Foreign Application Priority Data

Mar. 29, 2017  (JP) .................. 2017-065485
May 24, 2017   (JP) .................. 2017-102888

(51) Int. Cl.
*G09G 3/34*    (2006.01)
*H04M 1/02*    (2006.01)
*G09G 5/377*   (2006.01)

(52) U.S. Cl.
CPC .......... *G09G 3/346* (2013.01); *G09G 5/377* (2013.01); *H04M 1/0266* (2013.01); *G09G 2300/023* (2013.01); *H04M 2250/16* (2013.01)

(58) Field of Classification Search
CPC .... G06F 1/16; G06F 3/04; G06F 3/14; G09G 2300/02; H04M 2250/16; H04M 1/02
See application file for complete search history.

(56) References Cited

U.S. PATENT DOCUMENTS

| | | | |
|---|---|---|---|
| 2004/0125430 A1* | 7/2004 | Kasajima | G02F 1/133536 359/247 |
| 2012/0309465 A1* | 12/2012 | Tani | G06F 1/1624 455/566 |
| 2014/0192281 A1* | 7/2014 | Smithwick | G02F 1/1313 349/15 |
| 2016/0132281 A1* | 5/2016 | Yamazaki | G06F 3/1446 345/1.3 |

FOREIGN PATENT DOCUMENTS

WO    2014/175455 A1    10/2014

* cited by examiner

*Primary Examiner* — Cara E Rakowski
*Assistant Examiner* — Danell L Owens

(57) ABSTRACT

Provided is a mobile electronic device, comprising a first display configured to have a first display area, a second display that is overlapped with a display surface side of the first display and configured to switch a transmissive state for transmitting incident light and a reflective state for reflecting incident light, and a controller configured to control presentation on the first display and presentation on the second display, wherein the second display is configured to have a second display area including a first area that is overlapped with at least part of the first display area and a second area that is not overlapped with the first display area.

14 Claims, 15 Drawing Sheets

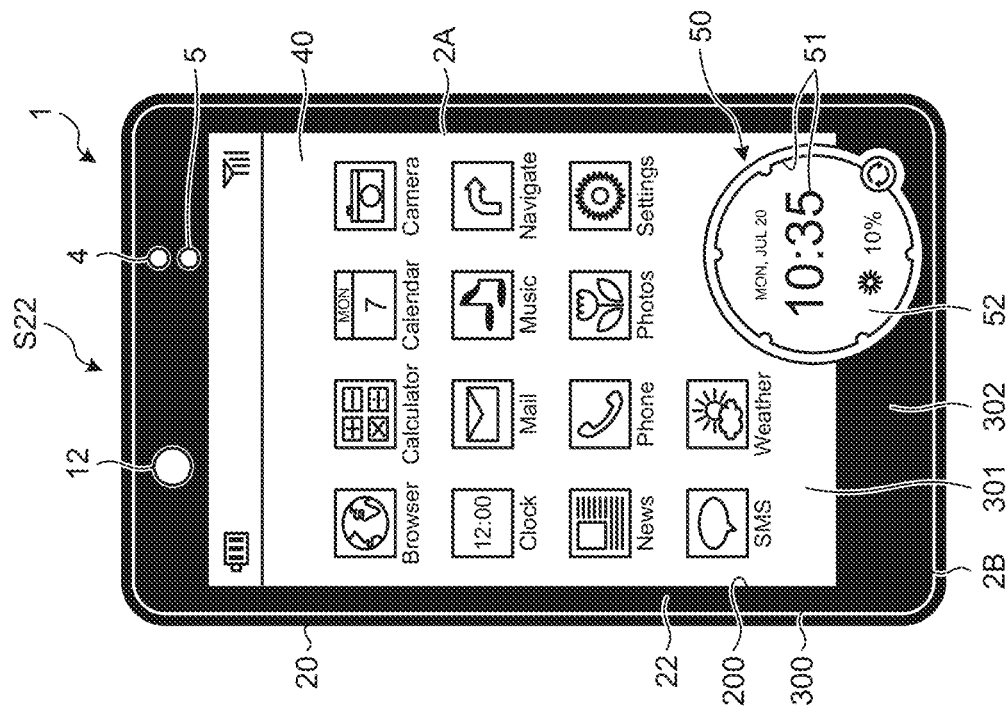
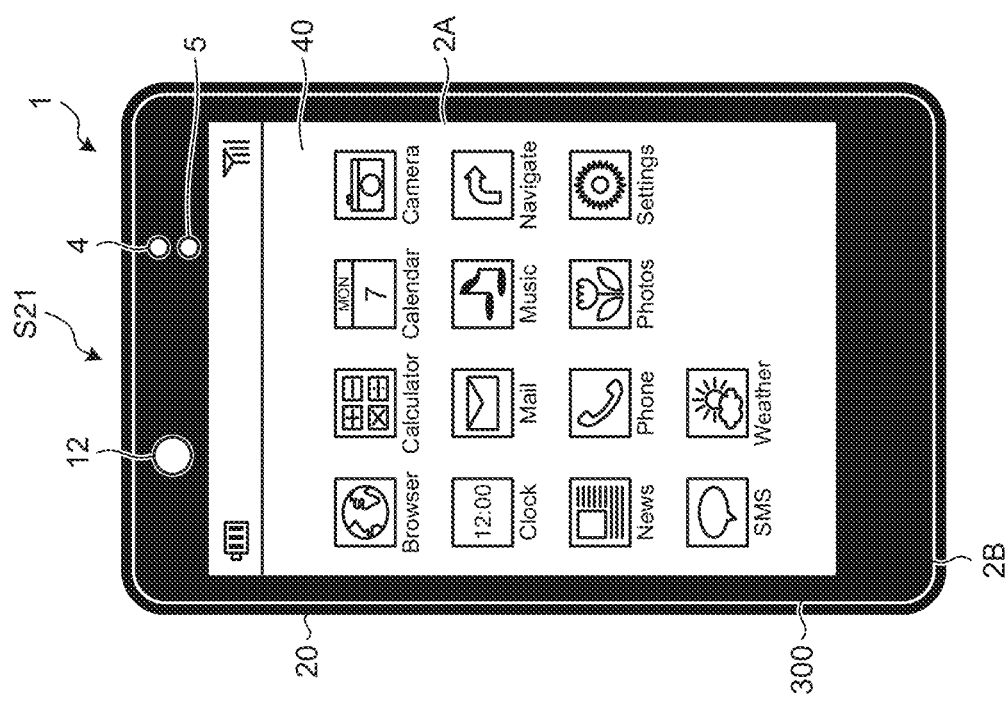
FIG.6

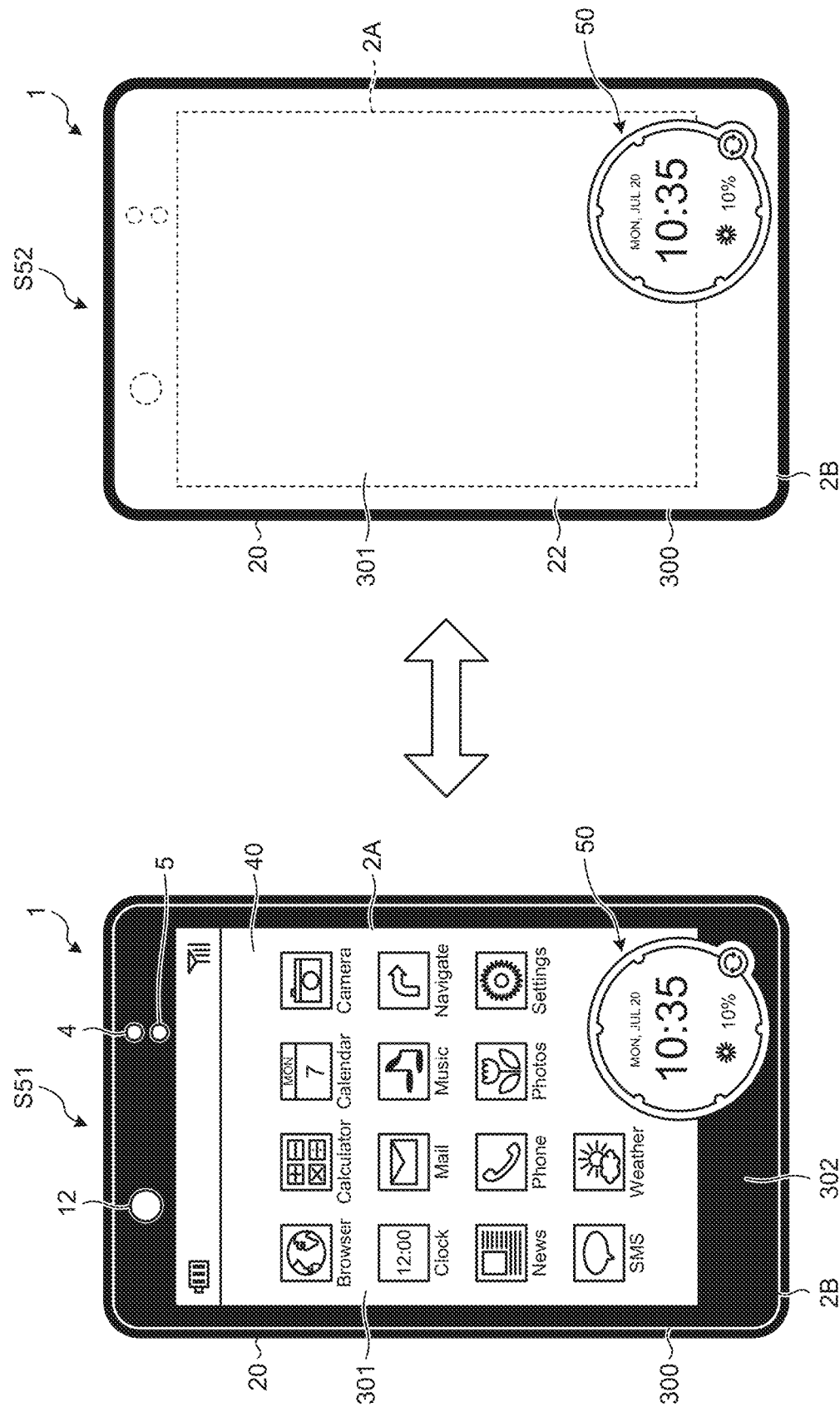

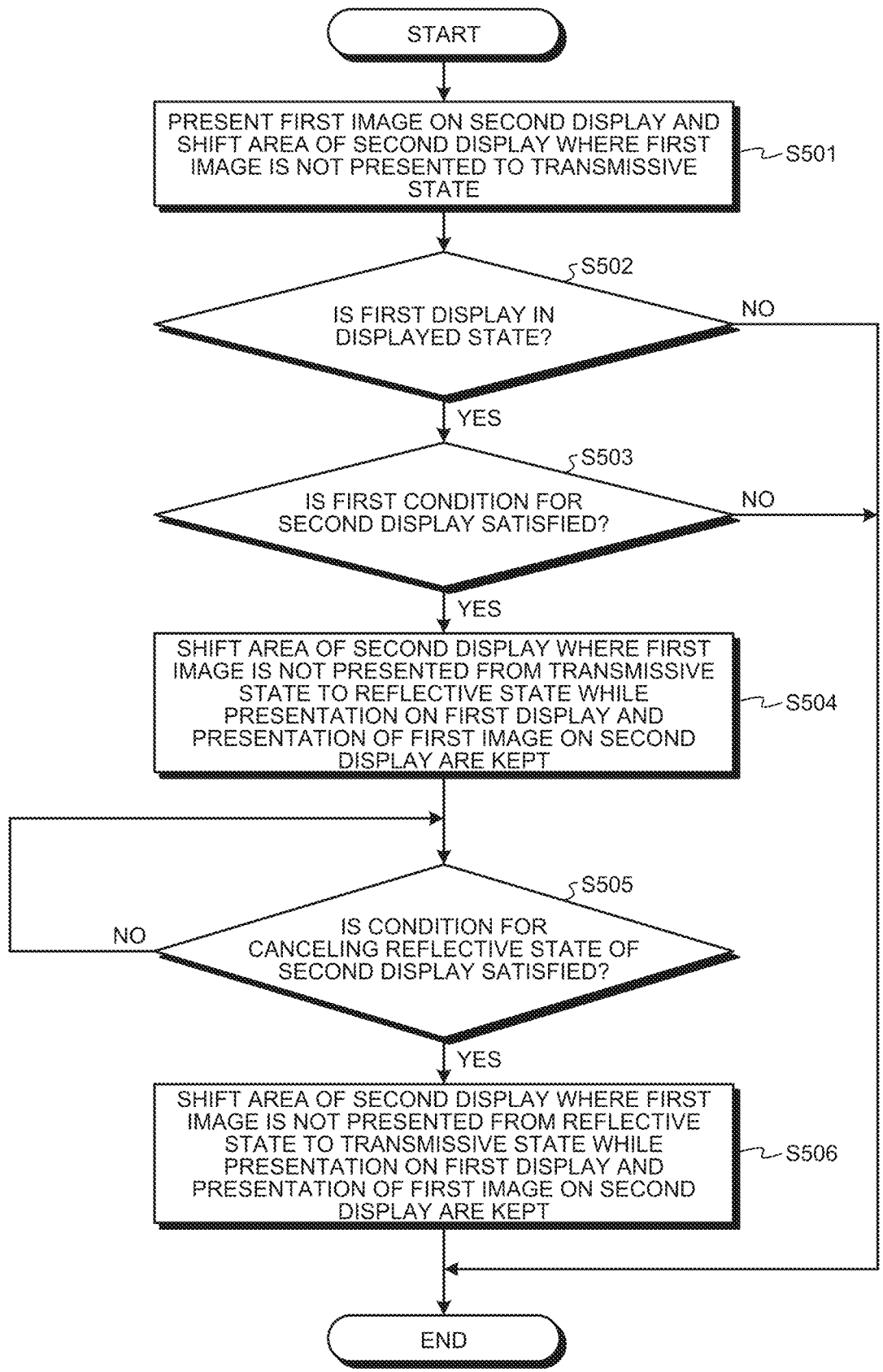

MOBILE ELECTRONIC DEVICE, CONTROL METHOD, AND CONTROL MEDIUM

CROSS-REFERENCE TO RELATED APPLICATION(S)

The present application claims priority under 35 U.S.C. § 119 to Japanese Patent Application No. 2017-065485 filed on Mar. 29, 2017, entitled "MOBILE ELECTRONIC DEVICE, CONTROL METHOD, AND CONTROL PROGRAM" and Japanese Patent Application No. 2017-102888 filed on May 24, 2017, entitled "MOBILE ELECTRONIC DEVICE, CONTROL METHOD, AND CONTROL PROGRAM," the contents of which are incorporated by reference herein in their entirety.

FIELD

The present application relates to a mobile electronic device, a control method, and a control medium.

BACKGROUND

There are known mobile electronic devices that include a transmissive display. Such a mobile electronic device uses a light source such as a backlight to make a transmissive display viewable.

SUMMARY

A mobile electronic device according to one embodiment includes a first display configured to have a first display area, a second display that is overlapped with a display surface side of the first display and configured to switch a transmissive state for transmitting incident light and a reflective state for reflecting incident light, and a controller configured to control presentation on the first display and presentation on the second display. The second display is configured to have a second display area including a first area that is overlapped with at least part of the first display area and a second area that is not overlapped with the first display area.

A control method according to one embodiment is implemented by a mobile electronic device that includes a first display that is configured to have a first display area, and a second display that is overlapped with a display surface side of the first display and configured to switch a transmissive state for transmitting incident light and a reflective state for reflecting incident light, the second display being configured to have a second display area that includes a first area that is overlapped with at least part of the first display area and a second area that is not overlapped with the first display area. The control method includes steps of controlling presentation on the first display, and causing the second display area of the second display to present a first image that extends across the first area and the second area.

A non-transitory storage medium that stores a control code according to one embodiment causes, when executed by a device that includes a first display that is configured to have a first display area, and a second display that is overlapped with a display surface side of the first display and configured to switch a transmissive state for transmitting incident light and a reflective state for reflecting incident light, the second display being configured to have a second display area that includes a first area that is overlapped with at least part of the first display area and a second area that is not overlapped with the first display area, the device to execute steps of controlling presentation on the first display, and causing the second display area of the second display to present a first image that extends across the first area and the second area.

BRIEF DESCRIPTION OF THE DRAWINGS

FIG. 6 is a diagram that illustrates an example of the display control conducted by the smartphone according to embodiments;

FIG. 13 is a diagram that illustrates another example of the display control conducted by the smartphone according to embodiments;

FIG. 14 is a flowchart that illustrates another example of the steps of the process for the display control related to the second display of the smartphone according to embodiments;

DETAILED DESCRIPTION

With reference to drawings, a detailed explanation is given of embodiments for implementing a mobile electronic device, a control method, and a control medium according to the present application. Hereafter, a smartphone is explained as an example of the mobile electronic device.

Embodiment

Figure 1:
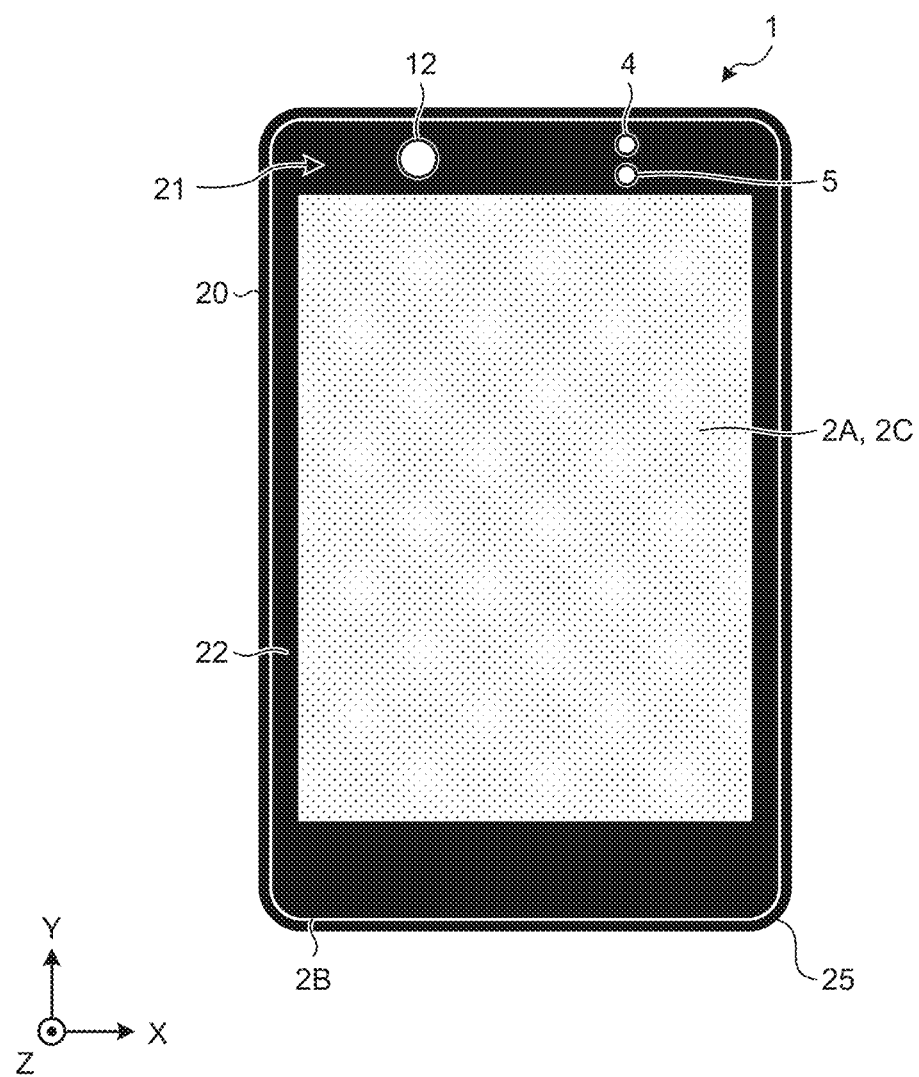
FIG. 1 is a front view that illustrates an example of a smartphone according to embodiments.
Figure 2:
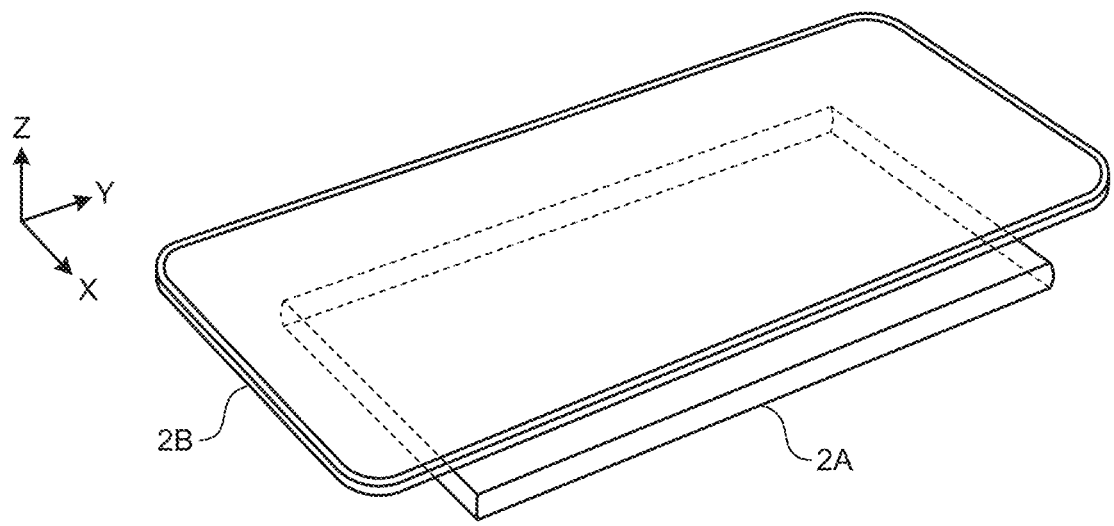
FIG. 2 is a diagram that illustrates an example of arrangement of displays of the smartphone according to embodiments.
Figure 3:
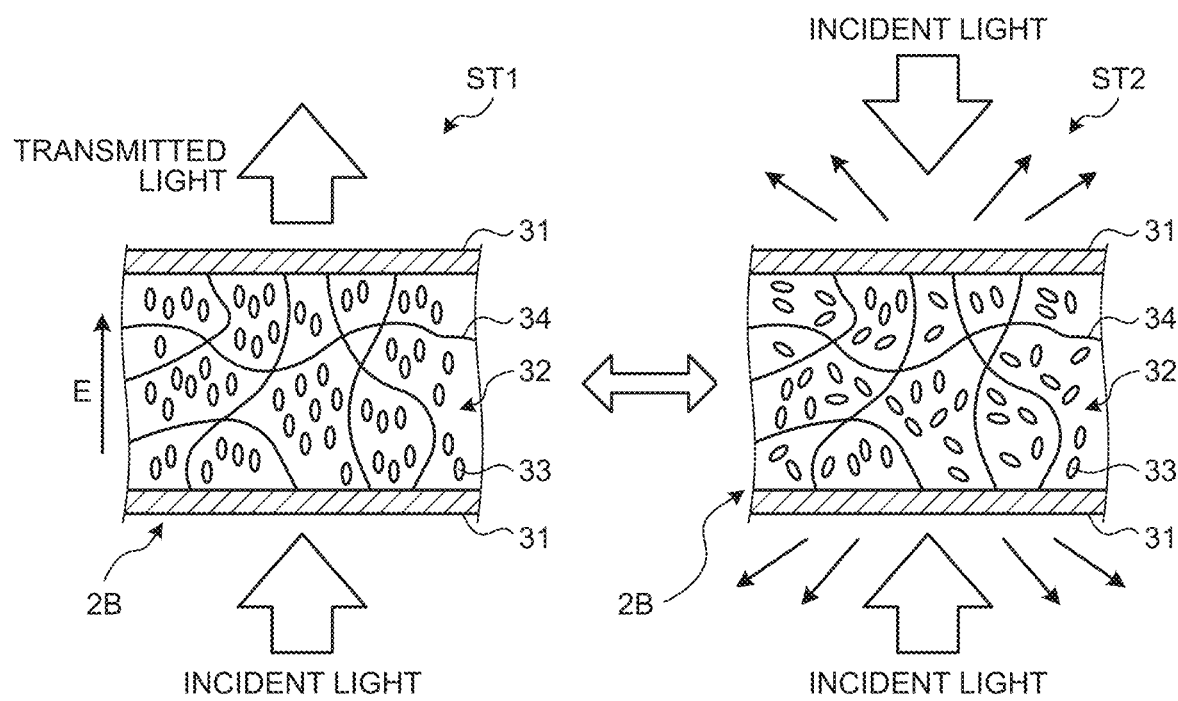
FIG. 3 is a diagram that illustrates an example of the state of a second display according to embodiments.

Conventional mobile electronic devices may have room for improving the technology for offering a wide range of variations for presentation using displays. With reference to FIGS. 1 to 4, the overall configuration of a smartphone 1 according to embodiments is explained. FIG. 1 is a front view that illustrates an example of the smartphone 1 according to embodiments. FIG. 2 is a diagram that illustrates an example of arrangement of displays of the smartphone 1 according to embodiments. FIG. 3 is a diagram that illustrates an example of the state of a second display according to embodiments.

As illustrated in FIG. 1, the smartphone 1 includes a housing 20. The housing 20 includes a principal surface 21. The principal surface 21 is the front surface (display surface) of the smartphone 1. The principal surface 21 of the smartphone 1 is provided with a first display 2A, a second display 2B, a touch screen 2C, an illuminance sensor 4, a proximity sensor 5, and a camera 12.

The first display 2A and the touch screen 2C have substantially a rectangular shape that conforms to the rim of the principal surface 21. On the principal surface 21, the first display 2A and the touch screen 2C are enclosed by a front panel 22 of the housing 20. Although each of the first display 2A and the touch screen 2C has substantially a rectangular shape, the shapes of the first display 2A and the touch screen 2C are not limited thereto. Each of the first display 2A and the touch screen 2C may have any shape such as a square or a circle. In the example of FIG. 1, the first display 2A and the touch screen 2C are provided in an overlapped manner; however, the positions of the first display 2A and the touch screen 2C are not limited thereto. For example, the first display 2A and the touch screen 2C may be arranged side by side or may be located apart from each other. In the example of FIG. 1, the long side of the first display 2A meets the long side of the touch screen 2C, and the short side of the first display 2A meets the short side of the touch screen 2C; however, the manner of overlapping the first display 2A and the touch screen 2C is not limited thereto. If the first display 2A and the touch screen 2C are provided in an overlapped manner, for example, one or more sides of the first display 2A do not need to meet any sides of the touch screen 2C.

The first display 2A includes a display device such as a liquid crystal display (LCD), an organic EL display (OELD), or an inorganic EL display (IELD). The first display 2A includes a transmissive display or a self-luminous display. In embodiments, an explanation is given of a case where the first display 2A is a liquid crystal display that includes a backlight.

The second display 2B has the shape similar to the principal surface 21 of the housing 20. The second display 2B is formed to be larger than the first display 2A. The second display 2B is overlapped with the entire front surface of the front panel 22 of the housing 20 and the first display 2A. The entire front surface of the second display 2B is covered with a reinforced glass 25. The second display 2B is sandwiched between the first display 2A and the reinforced glass 25. The second display 2B may be bonded between the first display 2A and the reinforced glass 25 with for example light curing resin or adhesive agent.

The second display 2B includes polymer network liquid crystal (PNLC), electronic paper, or the like. In embodiments, an explanation is given of a case where the second display 2B is a polymer network liquid crystal display.

As illustrated in FIG. 3, the second display 2B includes substrates 31 that are glass or transparent film (for example, made of organic material) and a liquid crystal layer 32. The second display 2B has a transmissive state ST1 for transmitting incident light and a reflective state ST2 for reflecting incident light.

The transmissive state ST1 is a state where a voltage is applied to the substrate 31 of the second display 2B. In the transmissive state ST1, liquid crystal molecules 33 are arrayed in an electric field direction E due to application of the voltage so that the second display 2B enters a transparent state. In the transmissive state ST1, the second display 2B passes incident light. In the transmissive state ST1, the second display 2B causes the incident light entering from outside of the substrate 31 to be output from the substrate 31 on the opposite side as transmitted light. In the transmissive state ST1, the second display 2B exhibits transparency as incident light is not scattered. In the transmissive state ST1, the second display 2B is capable of causing users to view the first display 2A, the front panel 22, or the like, on the background. The transmissive state ST1 includes a state where the background of the second display 2B is viewable by users through the second display 2B. The transmissive state ST1 may include a translucent state.

The reflective state ST2 is a state where no voltage is applied to the substrate 31 of the second display 2B. In the reflective state ST2, the second display 2B induces a state where the liquid crystal molecules 33 are randomly arranged due to the effect of a web-like polymer network 34 inside the liquid crystal layer 32 so as to reflect and scatter light. In the reflective state ST2, the second display 2B is capable of generating an opaque state due to light reflection and scattering by the liquid crystal molecules 33. In the reflective state ST2, the second display 2B may cause users to view an opaque area of the second display 2B due to reflected and scattered light. The second display 2B is capable of masking the first display 2A, the front panel 22, and the like, on the background with the opaque area that is in the reflective state ST2. Generation of the transmissive state ST1 and the reflective state ST2 depending on the presence or absence of voltage application means that they are switchable depending on the presence or absence of voltage application, and the transmissive state ST1 is not uniquely determined by voltage application itself. Specifically, although in the case described above the second display 2B enters a transparent state due to application of a voltage, there may be a reverse configuration such that the second display 2B enters the transmissive state ST1 in a state where no voltage is applied and enters the reflective state ST2 in a state where a voltage is applied. Hereinafter, an explanation is given based on the assumption that the second display 2B enters the transmissive state ST1 in a state where a voltage is applied to the substrate 31 and the second display 2B enters the reflective state ST2 in a state where no voltage is applied to the substrate 31.

In embodiments, an explanation is given of a case where the second display 2B causes areas in the reflective state ST2 to seem to have white turbidity to users due to reflection and scattering of light outside the smartphone 1 by the liquid crystal molecules 33; however, the embodiments are not limited thereto. For example, the second display 2B may use material that exhibits color other than white.

Figure 4:
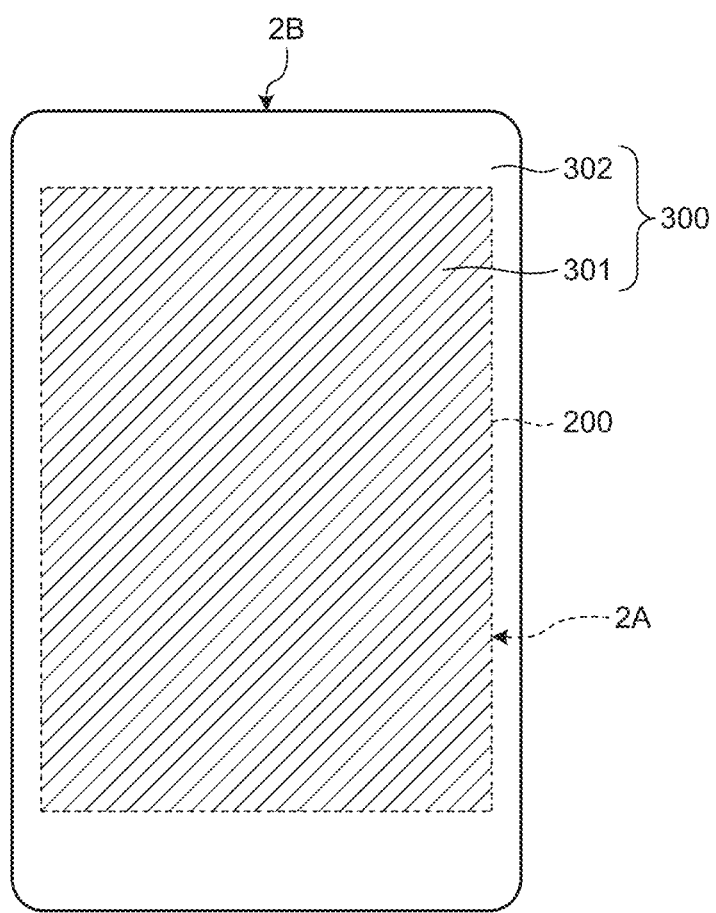
FIG. 4 is a diagram that illustrates an example of display areas of a first display and the second display according to embodiments.

FIG. 4 is a diagram that illustrates an example of display areas of the first display 2A and the second display 2B according to embodiments. As illustrated in FIG. 4, the first display 2A includes a first display area 200. The first display area 200 is a display surface for the first display 2A to present various types of information. The second display 2B includes a second display area 300. The second display area 300 includes a first area 301 and a second area 302. For example, the first area 301 includes an area of the second display area 300 that is overlapped with the first display area 200 of the first display 2A. The second area 302 includes an area of the second display area 300 that is not overlapped with the first display area 200. The second area 302 includes an area of the second display area 300 that is overlapped with the front panel 22 illustrated in FIG. 1.

In embodiments, an explanation is given of a case where the second display 2B covers substantially the entirety of the principal surface 21 of the housing 20; however, the embodiments are not limited thereto. For example, the second display 2B may cover only a predetermined area of the principal surface 21 of the housing 20. The predetermined area may be, for example, at least one of areas on the upper side or the lower side of the first display 2A on the principal surface 21. The predetermined area may be, for example, part of the front panel 22. For example, if an operation button, or the like, is provided on the front panel 22 of the housing 20 in the smartphone 1, the second display 2B may be provided on the principal surface 21 such that it is not overlapped with the operation button, or the like.

The touch screen 2C detects the contact with the touch screen 2C by finger, pen, stylus pen, or the like. The touch screen 2C may detect the positions of the contact with the touch screen 2C by multiple fingers, pens, stylus pens, or the like. In the following explanation, the finger, pen, stylus pen, or the like, which is in contact with the touch screen 2C, is sometimes referred to as a "contact object" or "contact matter".

The detection system of the touch screen 2C may be any system, such as a capacitive system, a resistive layer system, a surface acoustic wave system (or an ultrasonic system), an infrared system, an electromagnetic induction system, or a load sensing system. In the following explanation, for ease of explanation, it is assumed that the user touches the touch screen 2C by using a finger to operate the smartphone 1.

The smartphone 1 determines the type of gesture on the basis of at least one of the contact that is detected by the touch screen 2C, the position where the contact is detected, a change in the position where the contact is detected, the interval of contacts detected, and the number of times the contact is detected. The gesture is an operation that is performed on the touch screen 2C. Examples of the gesture determined by the smartphone 1 include, but are not limited to, touch, long touch, release, swipe, tap, double tap, long tap, drag, flick, pinch-in, pinch-out, etc.

The smartphone 1 performs operation in accordance with the gestures that are determined through the touch screen 2C. Thus, the operability that is intuitive and easy-to-use for users may be achieved. The operation performed by the smartphone 1 in accordance with the determined gesture is sometimes different depending on the screen that is presented on the first display 2A. In the following explanation, for ease of explanation, "the touch screen 2C detects the contact and the smartphone 1 determines that the type of gesture is X on the basis of the detected contact" is sometimes described as "the smartphone detects X" or "the controller detects X".

Figure 5:
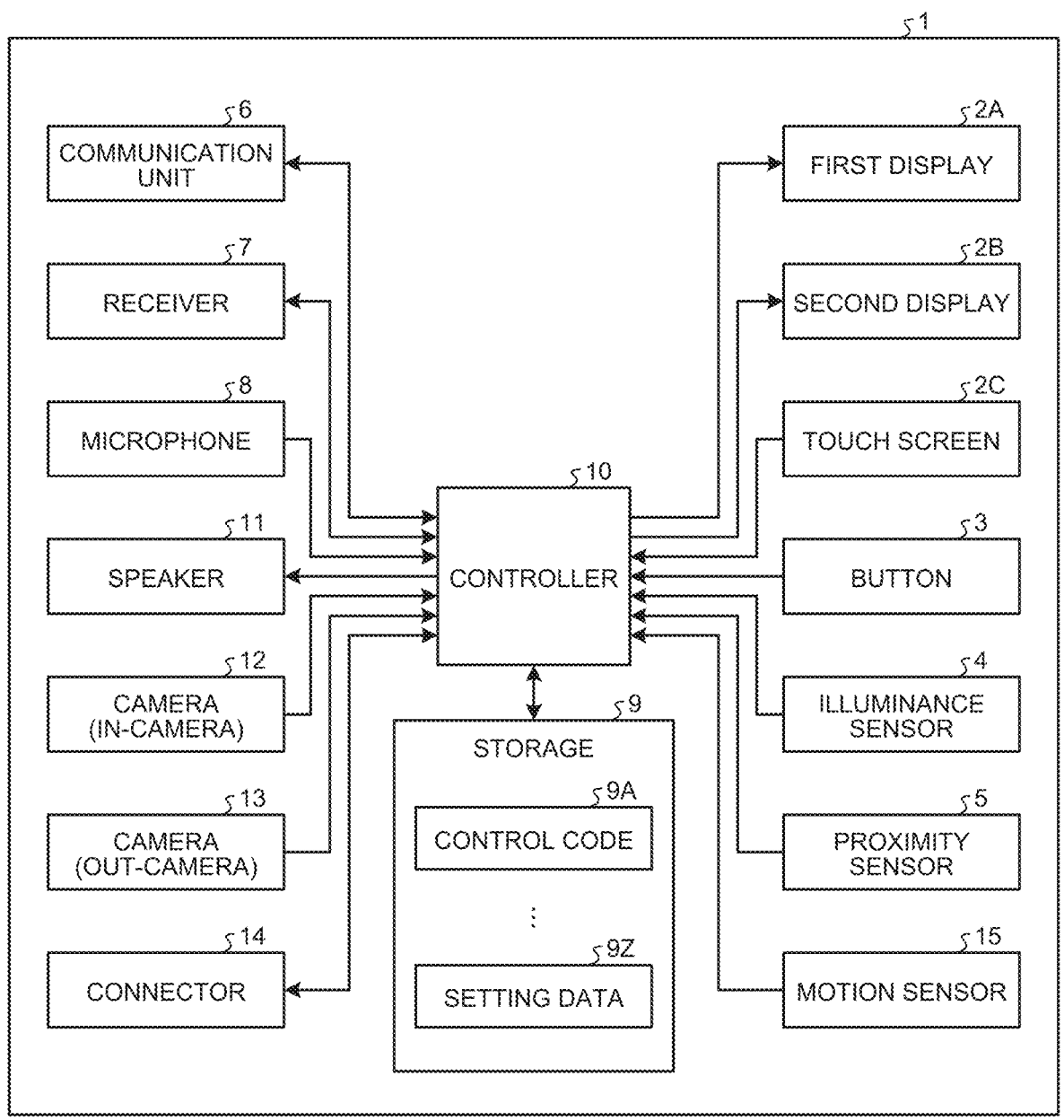
FIG. 5 is a block diagram of the smartphone according to embodiments.

FIG. 5 is a block diagram of the smartphone 1 according to embodiments. The smartphone 1 includes the first display 2A, the second display 2B, the touch screen 2C, a button 3, the illuminance sensor 4, the proximity sensor 5, a communication unit 6, a receiver 7, a microphone 8, a storage 9, a controller 10, a speaker 11, the camera 12, a camera 13, a connector 14, and a motion sensor 15.

The first display 2A presents texts, images, symbols, graphics, and the like. The second display 2B presents texts, images, symbols, graphics, and the like. The second display 2B presents images for masking the first display 2A, the front panel 22, or the like. The second display 2B presents images for decorating the smartphone 1. The touch screen 2C detects contact. The controller 10 detects gestures on the smartphone 1. Specifically, the controller 10 detects operation (gesture) on the touch screen 2C in cooperation with the touch screen 2C.

The button 3 is operated by users. The button 3 includes for example a power on/off button of the smartphone 1. The button 3 may be also used as a sleep/sleep-cancel button. The button 3 may include for example a sound volume button. The controller 10 detects operation on the button 3 in cooperation with the button 3. Examples of the operation on the button 3 include, but are not limited to, click, double click, triple click, push, multi-push, etc.

The illuminance sensor 4 detects the illuminance of the surrounding light of the smartphone 1. The illuminance is the value of the light flux that enters a unit area of the measurement surface of the illuminance sensor 4. The illuminance sensor 4 is used to for example adjust the brightness of the first display 2A. The proximity sensor 5 detects the presence of an object in the neighborhood in a non-contact manner. The proximity sensor 5 detects the presence of an object on the basis of a change in the magnetic field, a change in the return time of a reflected wave of an ultrasonic wave, or the like. The proximity sensor 5 detects that, for example, the first display 2A and the second display 2B are brought close to the face. The illuminance sensor 4 and the proximity sensor 5 may be configured as a single sensor. The illuminance sensor 4 may be used as the proximity sensor 5.

The communication unit 6 performs communication via radio waves. The communication system supported by the communication unit 6 is a radio communication standard. Examples of the radio communication standard include, but are not limited to, the communication standard for cellular phones, such as 2G, 3G, 4G, etc. Examples of the communication standard for cellular phones include, but are not limited to, LTE (Long Term Evolution), W-CDMA (Wideband Code Division Multiple Access), CDMA2000 (Wideband Code Division Multiple Access 2000), PDC (Personal Digital Cellular), GSM (registered trademark) (Global System for Mobile Communications), PHS (Personal Handyphone System), etc. Furthermore, examples of the radio communication standard include, but are not limited to, WiMAX (Worldwide Interoperability for Microwave Access), IEEE802.11, Bluetooth (registered trademark), IrDA (Infrared Data Association), NFC (Near Field Communication), etc. The communication unit 6 may support one or more out of the above-described communication standards.

The receiver 7 and the speaker 11 are examples of an output unit that outputs sound. The receiver 7 and the speaker 11 are capable of outputting sound signals, transmitted from the controller 10, as sounds. The receiver 7 may be used to, for example, output the voice of the other person during a telephone call. The speaker 11 may be used to, for example, output the ring tone and music. One of the receiver 7 and the speaker 11 may perform the function of the other. The microphone 8 is an example of an input unit that inputs sound. The microphone 8 converts the voice of the user, or the like, into sound signals and transmits them to the controller 10.

The storage 9 is capable of storing codes and data. The storage 9 may be also used as a work area that temporarily stores processing results of the controller 10. The storage 9 includes a recording medium. The recording medium may include any non-transitory storage medium, such as a semiconductor storage medium or a magnetic storage medium.

The storage 9 may include multiple types of storage media. The storage 9 may include the combination of a portable storage medium, such as a memory card, an optical disk, or a magnetic optical disk, and a reading device for the storage medium. The storage 9 may include a storage device that is used as a temporary memory area, such as a RAM (Random Access Memory).

The codes stored in the storage 9 include an application executed in the foreground or the background and a control code that supports execution of the application. For example, the application causes the first display 2A to present the screen and causes the controller 10 to perform the operation that corresponds to the gesture that is detected through the touch screen 2C. The control code is for example the OS. The application and the control code are installable in the storage 9 through a wireless communication by the communication unit 6 or through a non-transitory storage medium.

The storage 9 stores for example a control code 9A and setting data 9Z. The setting data 9Z includes the information related to various settings about operations of the smartphone 1.

The control code 9A is capable of providing functions related to various controls for operating the smartphone 1. The control code 9A controls, for example, the communication unit 6, the receiver 7, the microphone 8, and the like, to make telephone calls. The functions provided by the control code 9A include the functions that perform various controls, such as changing the information presented on the first display 2A in accordance with the gesture that is detected via the touch screen 2C. The functions provided by the control code 9A include the function to control presentation on the first display 2A and the second display 2B. The control code 9A provides the function to limit reception of operations on the touch screen 2C, the button 3, and the like. The functions provided by the control code 9A include the function to detect that the user carrying the smartphone 1 is moving, has stopped, or the like, in accordance with a detection result of the motion sensor 15. The functions provided by the control code 9A are sometimes used in combination with the function provided by other codes.

The setting data 9Z includes the condition data for determining a predetermined condition to make a switchover between a displayed state and a hidden state of the first display 2A. The displayed state includes a state where the first display 2A is displayable. Examples of the hidden state include, but are not limited to, a state where the first display 2A is not displayable, a state where the power of the first display 2A is off, etc. The predetermined condition includes a condition for shifting from the displayed state to the hidden state of the first display 2A. For example, the predetermined condition includes a condition for determining whether a predetermined time has elapsed after a user finished operation. For example, the predetermined condition includes a condition for determining whether a predetermined time has elapsed after the smartphone 1 is placed. The condition data includes a condition for shifting from the displayed state to the hidden state of the first display 2A. The condition data includes a condition for shifting from the hidden state to the displayed state of the first display 2A. The setting data 9Z includes the data for setting images to be displayed on the second display 2B, display positions, and the like.

The controller 10 is an arithmetic processing device. Examples of the arithmetic processing device include, but are not limited to, a CPU (central processing unit), a SoC (System-on-a-chip), an MCU (micro control unit), an FPGA (field-programmable gate array), a coprocessor, etc. The controller 10 may integrally control operation of the smartphone 1. Various functions of the controller 10 may be implemented in accordance with the control of the controller 10.

Specifically, the controller 10 may execute commands included in codes that are stored in the storage 9. The controller 10 may refer to the data stored in the storage 9 as needed. The controller 10 controls functional units in accordance with data and commands. The controller 10 controls functional units to implement various functions. Examples of the functional unit include, but are not limited to, the first display 2A, the second display 2B, the communication unit 6, the receiver 7, the speaker 11, etc. The controller 10 sometimes changes control in accordance with a detection result of a detector. Examples of the detector include, but are not limited to, the touch screen 2C, the button 3, the illuminance sensor 4, the proximity sensor 5, the microphone 8, the camera 12, the camera 13, and the motion sensor 15, etc.

The controller 10 executes for example the control code 9A so as to perform various types of control, such as changing the information presented on the first display 2A in accordance with the gesture detected via the touch screen 2C.

The camera 12 and the camera 13 are capable of converting captured images into electric signals. The camera 12 is an in-camera that takes an image of the object that is opposed to the front panel 22. The camera 13 is an out-camera that takes an image of the object that is opposed to the back face.

The connector 14 is a terminal that is connected to a different device. The connector 14 may be a general-purpose terminal, such as a USB (universal serial bus), HDMI (registered trademark) (high-definition multimedia interface), Light Peak (Thunderbolt (registered trademark)), or an earphone microphone connector. The connector 14 may be a dedicated terminal, such as a Dock connector. Examples of the device that is connected to the connector 14 include, but are not limited to, an external storage, a speaker, a communication device, etc.

The motion sensor 15 is capable of detecting various types of information for determining operation of the user carrying the smartphone 1. The motion sensor 15 may be configured as a sensor unit that includes for example an acceleration sensor, an orientation sensor, a gyroscope, a magnetic sensor, or a barometric pressure sensor.

In FIG. 5, all or some of the codes and data stored in the storage 9 may be downloaded from other devices through radio communication by the communication unit 6. In FIG. 5, all or some of the codes and data stored in the storage 9 may be stored in a non-transitory storage medium readable by a reading device included in the storage 9. In FIG. 5, all or some of the codes and data stored in the storage 9 may be stored in a non-transitory storage medium readable by a reading device connected to the connector 14. Examples of the non-transitory storage medium include, but are not limited to, an optical disk such as CD (registered trademark), DVD (registered trademark), or Blu-ray (registered trademark), a magnetic optical disk, a magnetic storage medium, a memory card, a solid state storage medium, etc.

The configuration of the smartphone 1 illustrated in FIG. 5 is an example, and modification may be made as appropriate without departing from the scope of the present disclosure. In the example illustrated in FIG. 5, the smartphone 1 includes the button 3; however, the smartphone 1 does not need to include the button 3. In the example illustrated in FIG. 5, the smartphone 1 includes 2 cameras; however, the smartphone 1 may include a single camera or may include no cameras.

FIG. 6 is a diagram that illustrates an example of the display control conducted by the smartphone 1 according to embodiments. As illustrated at Step S21 of FIG. 6, the smartphone 1 presents a home screen 40 on the first display 2A. At Step S21, the smartphone 1 sets the entire second display area 300 of the second display 2B to be in the transmissive state ST1. The smartphone 1 causes light from the first display 2A to be passed through the transparent second display 2B and output to outside of the smartphone 1. Accordingly, the user views the output light so as to view the home screen 40 presented on the first display 2A through the transparent second display 2B.

The smartphone 1 presents a first image 50 on the second display 2B as illustrated at Step S22 if a condition for displaying the first image 50 is satisfied. The condition for displaying the first image 50 includes, for example, a condition as to whether the first image 50 is to be displayed or not, or a timing for displaying the first image 50. The condition for displaying the first image 50 includes for example the condition for detecting a user's first operation to switch the display related to the first image 50. Examples of the first operation include, but are not limited to, double tap, long touch, slide, flick, shaking of the device, gripping of the device, etc. For example, the smartphone 1 is capable of detecting shaking operations in accordance with the acceleration that acts on the device. For example, the smartphone 1 is capable of detecting gripping operations in accordance with changes in the pressure within the device, a contact status of the touch screen 2C, or the like. The display condition is an operation set by the user of the device so that security can be ensured. If display of the first image 50 is effective, the smartphone 1 displays the first image 50 at a predetermined area of the second display area 300 that is overlapped with part of the home screen 40 on the first display 2A. The smartphone 1 displays the first image 50 on the second display area 300 such that it extends across the first area 301 and the second area 302 of the second display area 300.

The first image 50 includes a transmissive portion 51 and a reflective portion 52. The first image 50 is an image that combines the transmissive portion 51 and the reflective portion 52. The smartphone 1 controls the second display 2B such that the part of the second display area 300 that corresponds to the transmissive portion 51 of the first image 50 enters the transmissive state ST1 and the part of the second display area 300 that corresponds to the reflective portion 52 of the first image 50 enters the reflective state ST2. The smartphone 1 causes the user to view the transmissive portion 51 of the first image 50 in the color of the background. The smartphone 1 causes the user to view the reflective portion 52 of the first image 50 in the color of the opaque second display 2B.

In the example illustrated in FIG. 6, an explanation is given of a case where the first image 50 is an image of the clock application; however, the embodiments are not limited thereto. Examples of the first image 50 include, but are not limited to, still images, moving images, etc. The transmissive portion 51 of the first image 50 includes images of numbers on the clock, texts, frames, or the like. The reflective portion 52 of the first image 50 includes images such as the background of the clock. The smartphone 1 may display part of the first display area 200 with which the transmissive portion 51 of the first image 50 is overlapped in the display color of the transmissive portion 51. For example, the smartphone 1 colors the background of the transmissive portion 51 of the first image 50 in black so that the transmissive portion 51 may be recognized in black.

The smartphone 1 may mask part of the first display area 200 of the first display 2A, with which the first image 50 is overlapped, with the reflective portion 52 of the first image 50. On the principal surface 21, the smartphone 1 is capable of displaying the first image 50 on the second area 302 of the second display area 300, i.e., the front panel 22, which cannot be presented on the first display 2A. By combining presentations on the first display 2A and the second display 2B, the smartphone 1 may make presentation that extends across the first display 2A and the front panel 22, thereby offering a wide range of variations for display. The smartphone 1 uses a polymer network liquid crystal as the second display 2B so that outside light visibility may be improved and power consumption may be reduced. If the condition for displaying the first image 50 is detection of the first operation, the smartphone 1 may make changes so as to display or hide the first image 50 in accordance with user's operation; thus, it is possible to offer a wide range of variations for display without reducing convenience.

The first image 50 includes the image that indicates the boundary between the first image 50 and presentation of the first display 2A. The first image 50 includes the image that indicates the boundary between the first image 50 and the front panel 22. In the example illustrated in FIG. 6, the first image 50 includes the image that indicates a ring-shaped frame using the transmissive portion 51. By presenting the first image 50 and the boundary between the front panel 22 and presentation of the first display 2A on the second display 2B, the smartphone 1 may cause the user to recognize that the first image 50 is being presented on the second display 2B.

Figure 7:
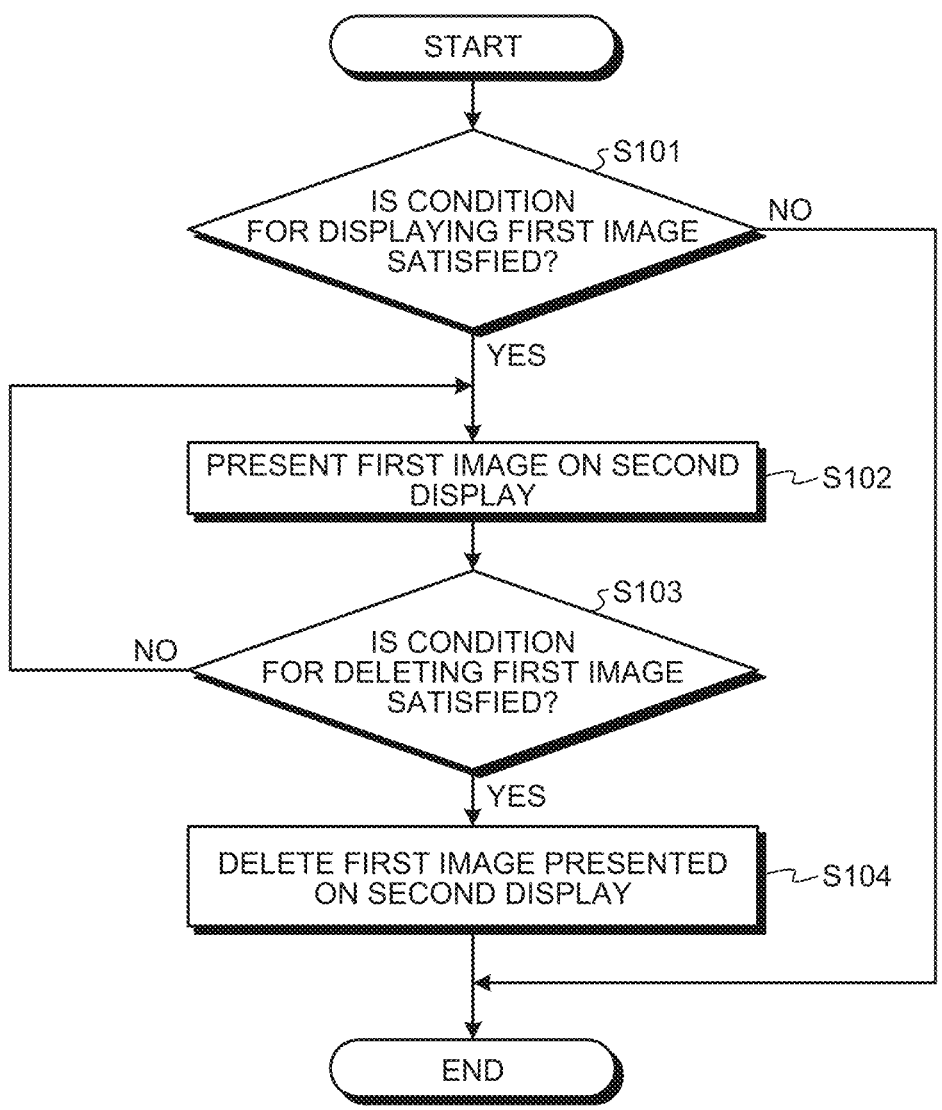
FIG. 7 is a flowchart that illustrates an example of the steps of the process for display control by the smartphone according to embodiments.

FIG. 7 is a flowchart that illustrates an example of the steps of the process for display control by the smartphone 1 according to embodiments. The steps of the process illustrated in FIG. 7 are performed when the controller 10 executes the control code 9A. The steps of the process illustrated in FIG. 7 are repeatedly performed by the controller 10.

As illustrated in FIG. 7, the controller 10 in the smartphone 1 determines whether the condition for displaying the first image 50 is satisfied on the basis of the setting details of the setting data 9Z, the display status of the first display 2A, or the like (Step S101). If it is determined that the condition for displaying the first image 50 is not satisfied (No at Step S101), the controller 10 terminates the steps of the process illustrated in FIG. 7. If it is determined that the condition for displaying the first image 50 is satisfied (Yes at Step S101), the controller 10 proceeds to the operation at Step S102.

The controller 10 presents the first image 50 on the second display 2B (Step S102). For example, the controller 10 presents it on the second display 2B such that the part of the second display area 300 that corresponds to the transmissive portion 51 of the first image 50 is in the transmissive state ST1 and the part of the second display area 300 that corresponds to the reflective portion 52 of the first image 50 is in the reflective state ST2.

After presenting the first image 50 on the second display 2B, the controller 10 determines whether the condition for deleting the first image 50 is satisfied (Step S103). The condition for deleting the first image 50 includes for example the condition for timing to delete the first image 50. The condition for deleting the first image 50 includes for example the condition for detecting user's deletion operation to delete the first image 50. Examples of the deletion operation include, but are not limited to, double tap, long touch, slide, flick, shake, grip, etc. If it is determined that the condition for deleting the first image 50 is not satisfied (No at Step S103), the controller 10 returns to the operation at Step S102 that has been already explained. If it is determined that the condition for deleting the first image 50 is satisfied (Yes at Step S103), the controller 10 proceeds to the operation at Step S104.

The controller 10 deletes the first image 50 that is presented on the second display 2B (Step S104). For example, the controller 10 shifts the part of the second display area 300 that corresponds to the reflective portion 52 of the first image 50 from the reflective state ST2 to the transmissive state ST1. Conversely, the controller 10 may shift the part of the second display area 300 that corresponds to the transmissive portion 51 of the first image 50 from the transmissive state ST1 to the reflective state ST2 so as to delete the first image 50. After the first image 50 is deleted, the controller 10 terminates the steps of the process illustrated in FIG. 7.

Figure 8:
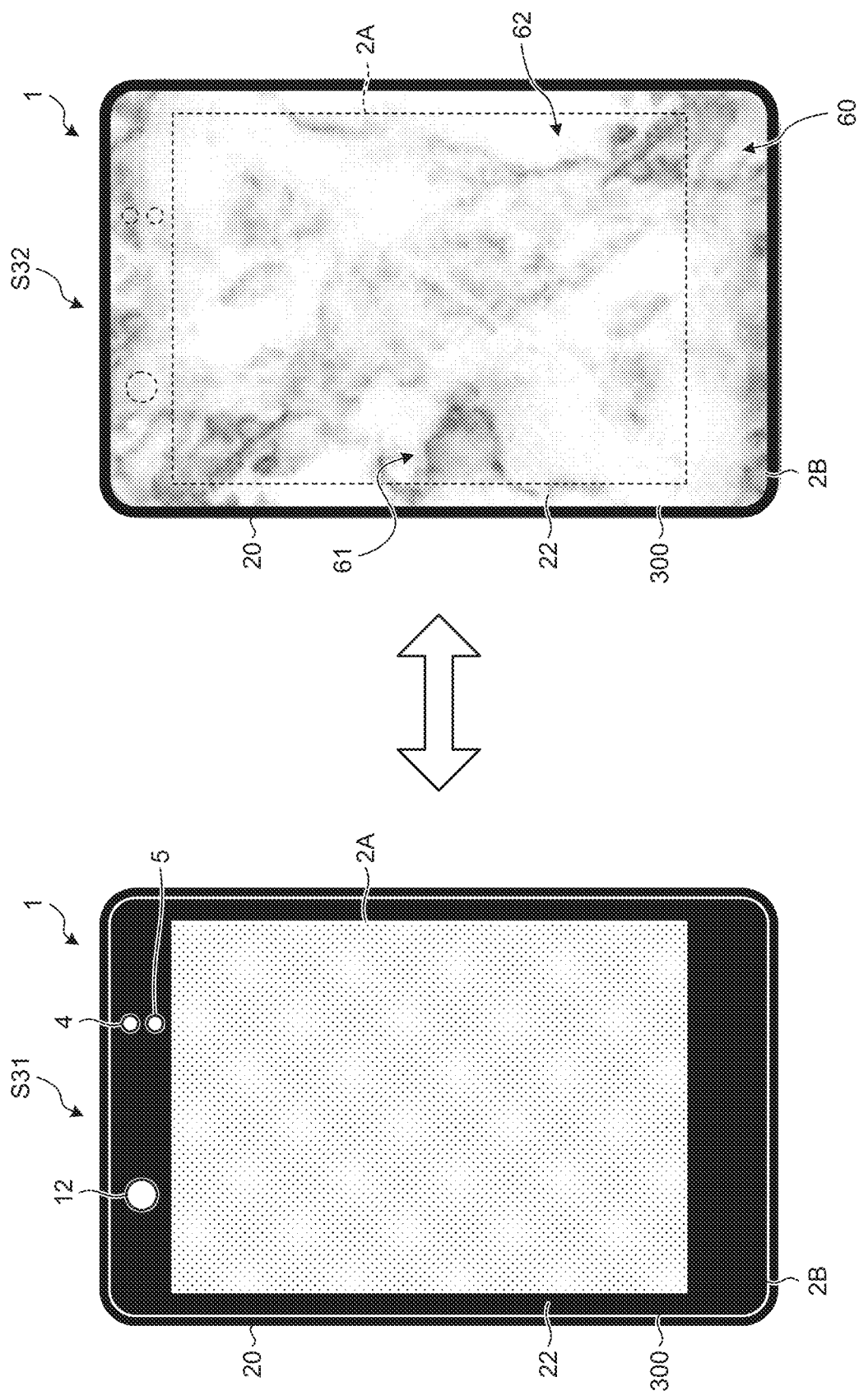
FIG. 8 is a diagram that illustrates another example of the display control conducted by the smartphone according to embodiments.

FIG. 8 is a diagram that illustrates another example of the display control conducted by the smartphone 1 according to embodiments. As illustrated at Step S31 of FIG. 8, the smartphone 1 sets the first display 2A in a hidden state (sleep state). While the first display 2A is in a hidden state, the smartphone 1 may reduce power consumption of the first display 2A; however, users recognize that the first display 2A is a black screen, a boring screen, or the like.

As illustrated at Step S32, the smartphone 1 is capable of presenting a second image 60 on the second display 2B. The second image 60 includes an image that decorates the external appearance of the smartphone 1. The second image 60 includes a transmissive portion 61 and a reflective portion 62. The second image 60 is an image that combines the transmissive portion 61 and the reflective portion 62. The smartphone 1 controls the second display 2B such that the part of the second display area 300 that corresponds to the transmissive portion 61 of the second image 60 enters the transmissive state ST1 and the part of the second display area 300 that corresponds to the reflective portion 62 of the second image 60 enters the reflective state ST2. The smartphone 1 causes the user to view the transmissive portion 61 of the second image 60 in the color of the background. The smartphone 1 causes the user to view the reflective portion 62 of the second image 60 in the color of the opaque second display 2B. The transmissive portion 61 may include a translucent part of the second image 60.

In the example illustrated in FIG. 8, the second image 60 has a marbled appearance of transparent part and white opaque part by changing the densities of pixels in the transmissive portion 61 and the reflective portion 62. If the first display 2A is in a hidden state and the condition for displaying the second image 60 is satisfied, the smartphone 1 may present the second image 60 having a marbled appearance on the entire second display area 300 of the second display 2B. By masking the first display 2A in a hidden state with the second image 60, the smartphone 1 may improve design while the power consumption of the first display 2A is reduced. By using a polymer network liquid crystal, electronic paper, or the like, as the second display 2B, the smartphone 1 may prevent an increase in the power consumption during a stand-by state and improve outside light visibility. The smartphone 1 may mask the illuminance sensor 4, the proximity sensor 5, and the camera 12, provided on the front panel 22, with the second image 60. Accordingly, the smartphone 1 may improve design by masking holes, or the like, on the front panel 22.

If the second image 60 is presented on the second display 2B, the smartphone 1 may delete the second image 60 from the second display 2B when the first display 2A shifts from a hidden state to a displayed state. The smartphone 1 may switch presentation of the second image 60 on the second display 2B to presentation on the first display 2A.

Figure 9:
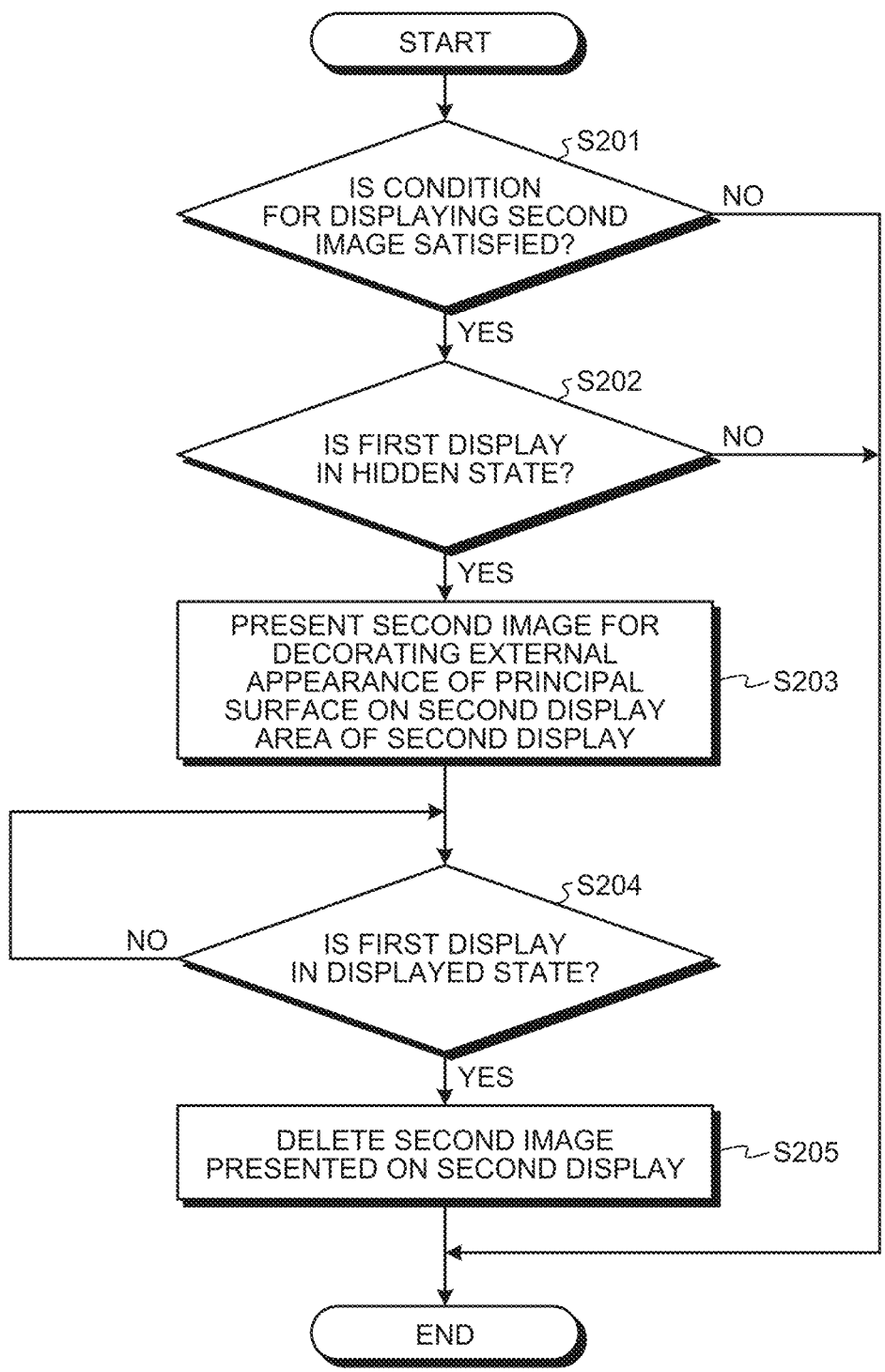
FIG. 9 is a flowchart that illustrates another example of the steps of the process for the display control by the smartphone according to embodiments.

FIG. 9 is a flowchart that illustrates another example of the steps of the process for the display control by the smartphone 1 according to embodiments. The steps of the process illustrated in FIG. 9 are performed when the controller 10 executes the control code 9A. The steps of the process illustrated in FIG. 9 are repeatedly performed by the controller 10.

As illustrated in FIG. 9, the controller 10 in the smartphone 1 determines whether the condition for displaying the second image 60 is satisfied on the basis of the setting details of the setting data 9Z (Step S201). The condition for displaying the second image 60 includes for example the condition for detecting user's second operation to switch the display related to the second image 60. Examples of the second operation include, but are not limited to, double tap, long touch, slide, flick, shaking of the device, gripping of the device, etc. If it is determined that the condition for displaying the second image 60 is not satisfied (No at Step S201), the controller 10 terminates the steps of the process illustrated in FIG. 9. If it is determined that the condition for displaying the second image 60 is satisfied (Yes at Step S201), the controller 10 proceeds to the operation at Step S202.

The controller 10 determines whether the first display 2A is in a hidden state (Step S202). If it is determined that the first display 2A is not in a hidden state (No at Step S202), the controller 10 terminates the steps of the process illustrated in FIG. 9. If it is determined that the first display 2A is in a hidden state (Yes at Step S202), the controller 10 proceeds to the operation at Step S203.

The controller 10 presents the second image 60 for decorating the external appearance of the principal surface 21 on the second display area 300 of the second display 2B (Step S203). For example, the controller 10 presents it on the second display 2B such that the part of the second display area 300 that corresponds to the transmissive portion 61 of the second image 60 is in the transmissive state ST1 and the part of the second display area 300 that corresponds to the reflective portion 62 of the second image 60 is in the reflective state ST2.

After presenting the second image 60 on the second display 2B, the controller 10 determines whether the first display 2A is in a displayed state (Step S204). If it is determined that the first display 2A is not in a displayed state (No at Step S204), the controller 10 returns the operation to Step S204 already explained. Specifically, because the first display 2A is in a hidden state, the controller 10 continuously presents the second image 60 on the second display 2B. If it is determined that the first display 2A is in a displayed state (Yes at Step S204), the controller 10 proceeds to the operation at Step S205.

The controller 10 deletes the second image 60 presented on the second display 2B (Step S205). For example, the controller 10 shifts the part of the second display area 300 that corresponds to the reflective portion 62 of the second image 60 from the reflective state ST2 to the transmissive state ST1. For example, if the second image 60 is presented on the entire surface of the second display 2B, the controller 10 shifts the entire surface of the second display 2B to the transmissive state ST1, thereby causing the entire surface of the second display 2B to be transparent. After deleting the second image 60, the controller 10 terminates the steps of the process illustrated in FIG. 9.

For example, if the condition for displaying the second image 60 is detection of the second operation, the smartphone 1 may switch presentation on the first display 2A and presentation on the second display 2B in accordance with user's operation, whereby it is possible to offer a wide range of variations for display without reducing the convenience.

In the example illustrated in FIG. 9, an explanation is given of a case where after the second image 60 is presented on the second display 2B, the controller 10 deletes the second image 60 if the first display 2A enters a displayed state; however, the embodiments are not limited thereto. For example, if the second operation, or the like, is detected while the second image 60 is being displayed, the controller 10 may delete the second image 60 from the second display 2B, make the second display 2B transparent (shifts the part of the second display area 300 that corresponds to the reflective portion 62 of the second image 60 from the reflective state ST2 to the transmissive state ST1), and shift the first display 2A to a displayed state.

Figure 10:
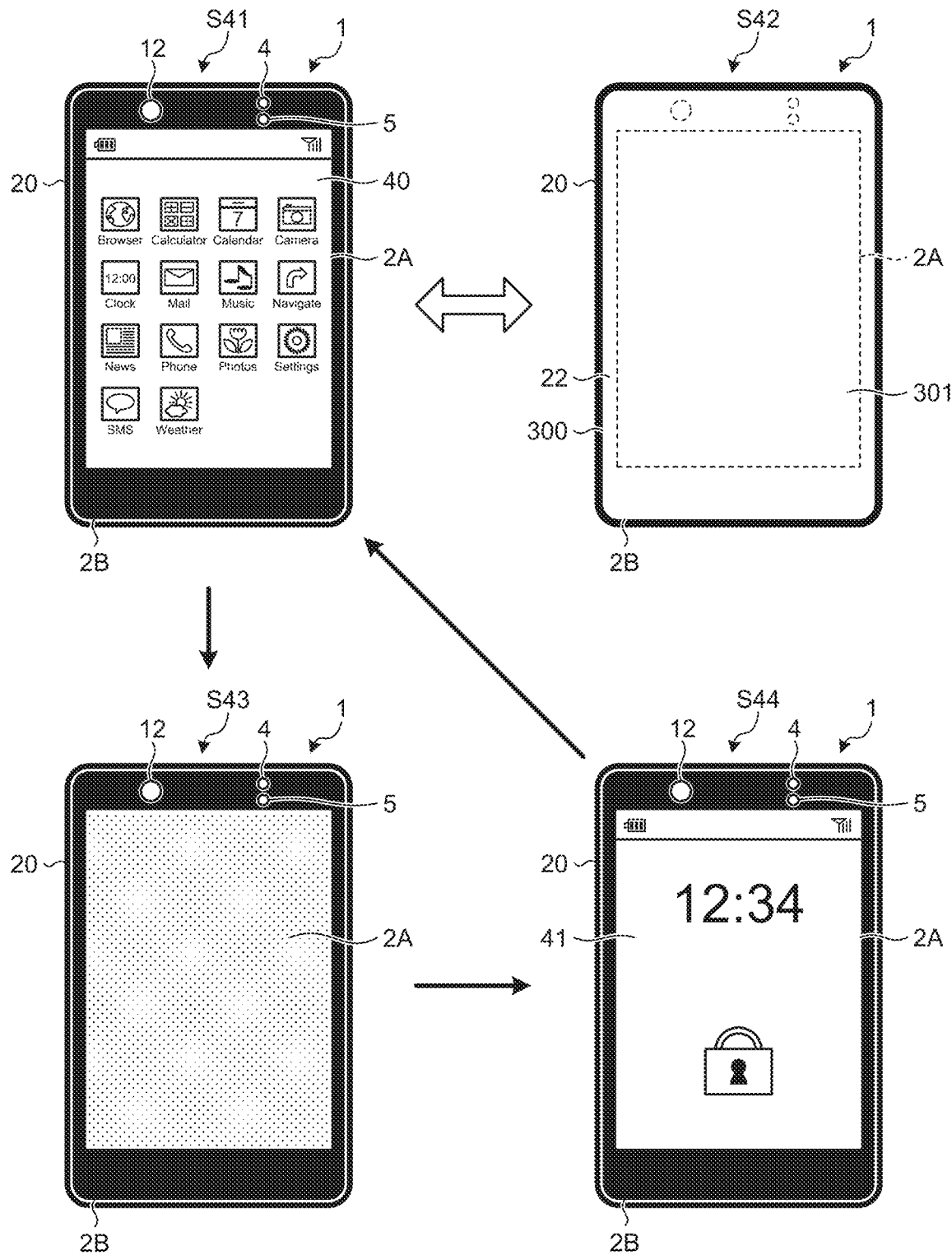
FIG. 10 is a diagram that illustrates another example of the display control conducted by the smartphone according to embodiments.

FIG. 10 is a diagram that illustrates another example of the display control conducted by the smartphone 1 according to embodiments. As illustrated at Step S41 of FIG. 10, the smartphone 1 presents the home screen 40 on the first display 2A. At Step S41, the smartphone 1 sets the entire second display area 300 of the second display 2B to be in the transmissive state ST1. The smartphone 1 causes light from the first display 2A to be transmitted through the transparent second display 2B and to be output to outside of the smartphone 1. Accordingly, the user views the output light so as to recognize the home screen 40 presented on the first display 2A through the transparent second display 2B.

If a first condition is satisfied, the smartphone 1 may shift at least the first area 301 of the second display 2B from the transmissive state ST1 to the reflective state ST2 while the presentation on the first display 2A is kept, as illustrated at Step S42. The first condition includes for example conditions such as detection of operation by a predetermined user, or detection of the previously set time and date. The first condition includes, for example, a condition for detection of a third operation by a user to switch the display related to the second display 2B. Examples of the third operation include, but are not limited to, double tap, long touch, slide, flick, shake, grip, etc. If the first condition is satisfied, the smartphone 1 may mask the contents presented on the first display 2A with the second display 2B. The smartphone 1 may use the second display 2B as a privacy glass. In the example illustrated in FIG. 10, the smartphone 1 shifts the entire second display area 300 of the second display 2B to the reflective state ST2; however, the embodiments are not limited thereto. For example, the smartphone 1 may shift only the first area 301 of the second display area 300 to the reflective state ST2. The smartphone 1 shifts the entire second display area 300 of the second display 2B to the reflective state ST2, thereby masking the illuminance sensor 4, the proximity sensor 5, and the camera 12, which are provided on the front panel 22.

If a condition for canceling the reflective state ST2 is satisfied after the second display area 300 of the second display 2B is shifted to the reflective state ST2, the smartphone 1 shifts the second display area 300 from the reflective state ST2 to the transmissive state ST1. Examples of the cancellation condition include, but are not limited to, conditions for detection that a cancellation time has elapsed after a shift to the reflective state ST2, detection of a predetermined cancellation operation, etc. The cancellation condition includes, for example, a condition of detection of user's cancellation operation to cancel the reflective state ST2 of the second display 2B. Examples of the cancellation operation include, but are not limited to, double tap, long touch, slide, flick, shake, grip, etc. If the cancellation condition is satisfied, the smartphone 1 shifts the second display area 300 from the reflective state ST2 to the transmissive state ST1. Accordingly, as illustrated at Step S41, the smartphone 1 is in a state such that presentation on the first display 2A is viewable. If the smartphone 1 is configured such that the reflective state ST2 is set when no electric potential is applied to the second display 2B, power consumption may be reduced. For example, users sometimes desire to temporarily conceal display of the smartphone 1 when other persons are in close, or the like. In such a case, when predetermined user's operation is detected, the smartphone 1 may temporarily mask presentation on the first display 2A with the second display 2B.

The smartphone 1 may provide the function to shift the first display 2A from a displayed state to a hidden state by restricting reception of operations on the touch screen 2C, the button 3, or the like, if a predetermined condition is satisfied in the state at Step S41. If the predetermined condition is satisfied, the smartphone 1 shifts the first display 2A to a hidden state as illustrated at Step S43. At Step S43, the smartphone 1 sets the entire second display area 300 of the second display 2B to be in the transmissive state ST1. Accordingly, users may view the smartphone 1 with the first display 2A in a hidden state (sleep state).

If an operation on the touch screen 2C, the button 3, or the like, is detected in the state at Step S43, the smartphone 1 presents a lock screen 41 on the first display 2A as illustrated at Step S44 so as to receive only an operation to cancel restriction. For example, the lock screen 41 is a screen that indicates that operations on the touch screen 2C, the button 3, or the like, are restricted. In the example illustrated in FIG. 10, an explanation is given of a case where the lock screen 41 presents the information that presents a clock and a key; however, the embodiments are not limited thereto. At Step S44, the smartphone 1 sets the entire second display area 300 of the second display 2B in the transmissive state ST1. Accordingly, users view output light so as to recognize the lock screen 41 presented on the first display 2A through the transparent second display 2B.

When an operation to cancel restriction of the smartphone 1 is detected in the state at Step S44, the smartphone 1 deletes the lock screen 41 from the first display 2A and presents the home screen 40 on the first display 2A as illustrated at Step S41. At Step S41, the smartphone 1 sets the entire second display area 300 of the second display 2B to be in the transmissive state ST1. Accordingly, restriction of the smartphone 1 is cancelled so that operation on the home screen 40, or the like, is received.

For example, as the first display 2A is masked with the second display 2B in the state at Step S42, the smartphone 1 does not shift the first display 2A from a displayed state to a hidden state even if the predetermined condition is satisfied. Accordingly, the smartphone 1 may temporarily conceal presentation on the first display 2A by using a method that is different from a sleep state. The smartphone 1 automatically cancels masking with the second display 2B due to the elapse of a cancellation time for the reflective state ST2, thereby eliminating the need for cancellation operation by users.

For example, if the condition for canceling the reflective state ST2 is detection of the cancellation operation defined by the user, the smartphone 1 is capable of shifting the second display 2B from the reflective state ST2 to the transmissive state ST1 in accordance with only an operation of the user, whereby a wide range of variations for display may be offered while security is ensured.

Figure 11:
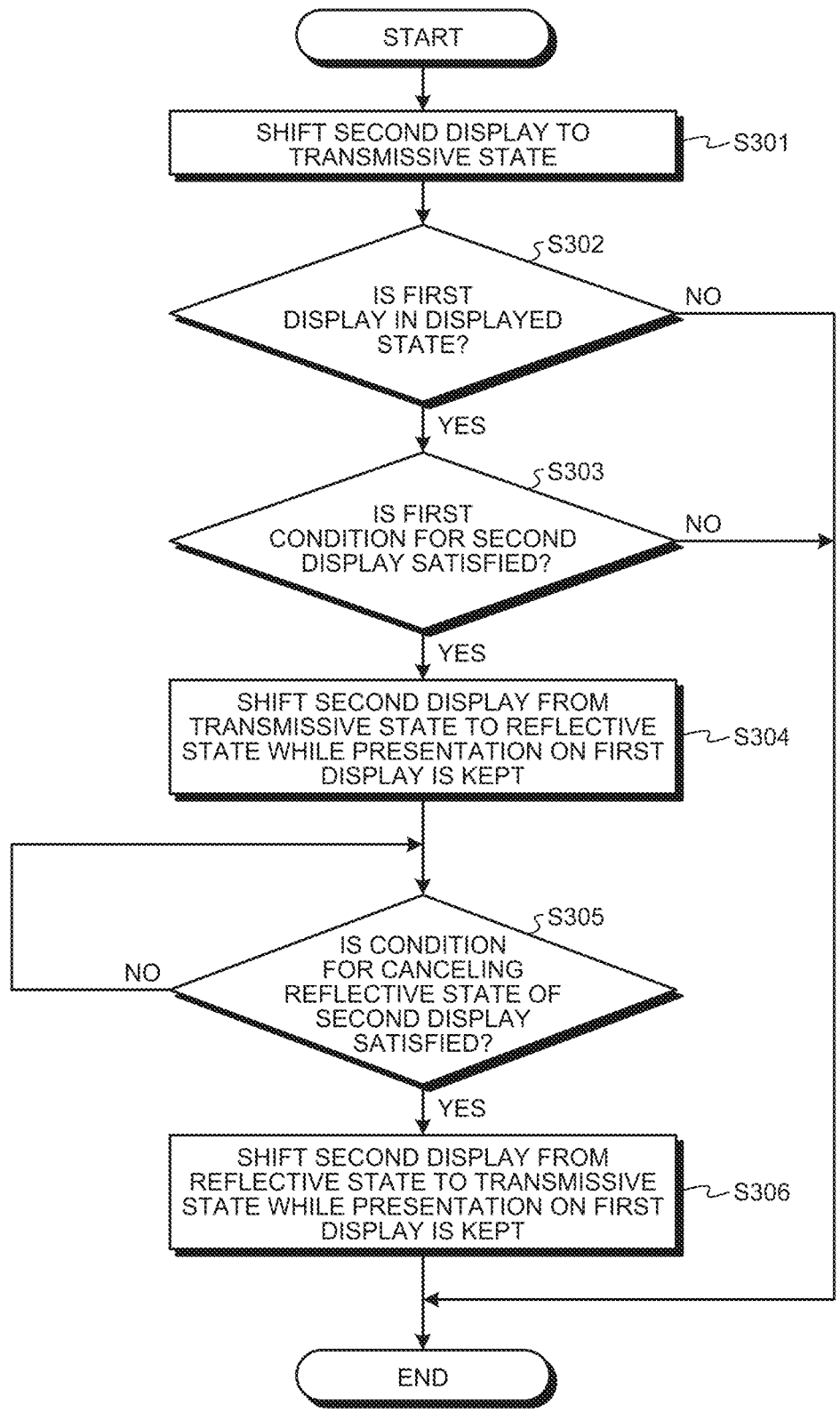
FIG. 11 is a flowchart that illustrates an example of the steps of the process for the display control related to the second display of the smartphone according to embodiments.

FIG. 11 is a flowchart that illustrates an example of the steps of the process for the display control related to the second display 2B of the smartphone 1 according to embodiments. The steps of the process illustrated in FIG. 11 are performed when the controller 10 executes the control code 9A. The steps of the process illustrated in FIG. 11 are repeatedly performed by the controller 10.

As illustrated in FIG. 11, the controller 10 of the smartphone 1 shifts the second display 2B to the transmissive state ST1 (Step S301). For example, the controller 10 applies a voltage to the substrate 31 of the second display 2B to shift the entire second display area 300 to the transmissive state ST1. After the second display 2B is shifted to the transmissive state ST1, the controller 10 proceeds to the operation at Step S302.

The controller 10 determines whether the first display 2A is in a displayed state (Step S302). If it is determined that the first display 2A is not in a displayed state (No at Step S302), the controller 10 terminates the steps of the process illustrated in FIG. 11. If it is determined that the first display 2A is in a displayed state (Yes at Step S302), the controller 10 proceeds to the operation at Step S303.

The controller 10 determines whether the first condition for the second display 2B is satisfied (Step S303). For example, the controller 10 determines that the first condition for the second display 2B is satisfied when a predetermined operation, a previously set time and date, or the like, is detected. If it is determined that the first condition for the second display 2B is not satisfied (No at Step S303), the controller 10 terminates the steps of the process illustrated in FIG. 11. If it is determined that the first condition for the second display 2B is satisfied (Yes at Step S303), the controller 10 proceeds to the operation at Step S304.

The controller 10 shifts the second display 2B from the transmissive state ST1 to the reflective state ST2 while presentation on the first display 2A is kept (Step S304). For example, the controller 10 stops the voltage from being applied to the substrate 31 of the second display 2B, thereby shifting the entire second display area 300 from the transmissive state ST1 to the reflective state ST2. After the second display 2B is shifted to the reflective state ST2, the controller 10 proceeds to the operation at Step S305.

The controller 10 determines whether the condition for canceling the reflective state ST2 of the second display 2B is satisfied (Step S305). For example, the controller 10 determines that the condition for canceling the reflective state ST2 is satisfied when the elapse of a cancellation time after a shift to the reflective state ST2, a predetermined cancellation operation, or the like, is detected. If it is determined that the condition for canceling the reflective state ST2 is not satisfied (No at Step S305), the controller 10 repeatedly performs the operation at Step S305, thereby keeping the reflective state ST2 of the second display 2B. If it is determined that the condition for canceling the reflective state ST2 is satisfied (Yes at Step S305), the controller 10 proceeds to the operation at Step S306.

The controller 10 shifts the second display 2B from the reflective state ST2 to the transmissive state ST1 while presentation on the first display 2A is kept (Step S306). For example, the controller 10 applies a voltage to the substrate 31 of the second display 2B, thereby shifting the entire second display area 300 to the transmissive state ST1. After the second display 2B is shifted to the transmissive state ST1, the controller 10 terminates the steps of the process illustrated in FIG. 11.

Figure 12:
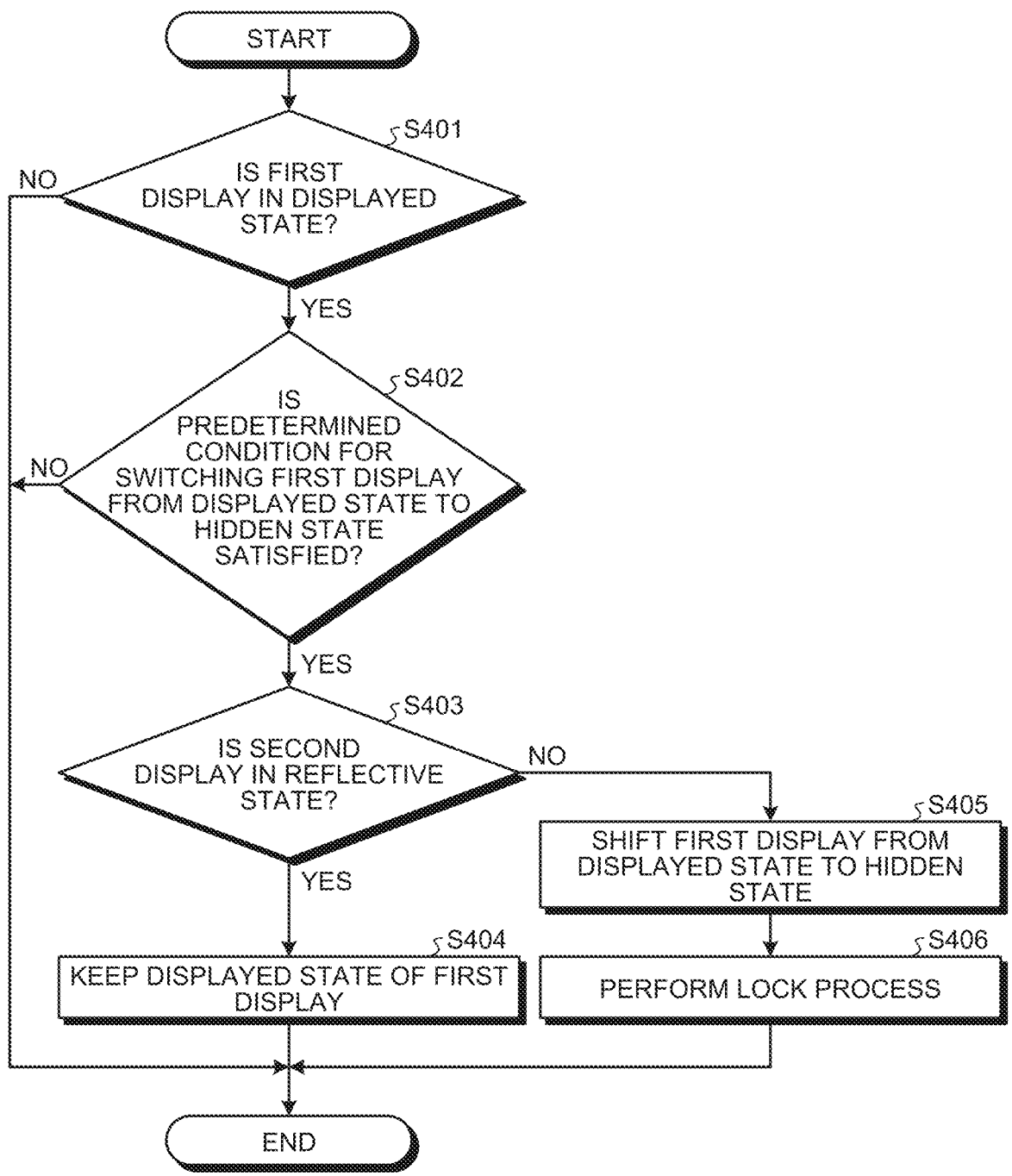
FIG. 12 is a flowchart that illustrates an example of the steps of the process for the display control related to the first display of the smartphone according to embodiments.

FIG. 12 is a flowchart that illustrates an example of the steps of the process for the display control related to the first display 2A of the smartphone 1 according to embodiments. The steps of the process illustrated in FIG. 12 are performed when the controller 10 executes the control code 9A. The controller 10 repeatedly performs the steps of the process illustrated in FIG. 12. The steps of the process illustrated in FIG. 12 are performed in parallel with the steps of the process illustrated in FIG. 11.

As illustrated in FIG. 12, the controller 10 of the smartphone 1 determines whether the first display 2A is in a displayed state (Step S401). If it is determined that the first display 2A is not in a displayed state (No at Step S401), the controller 10 terminates the steps of the process illustrated in FIG. 12. If it is determined that the first display 2A is in a displayed state (Yes at Step S401), the controller 10 proceeds to the operation at Step S402.

The controller 10 determines whether a predetermined condition for switching the first display 2A from a displayed state to a hidden state is satisfied (Step S402). If it is determined that the predetermined condition is not satisfied (No at Step S402), the controller 10 terminates the steps of the process illustrated in FIG. 12. If it is determined that the predetermined condition is satisfied (Yes at Step S402), the controller 10 proceeds to the operation at Step S403.

The controller 10 determines whether the second display 2B is in the reflective state ST2 (Step S403). If it is determined that the second display 2B is in the reflective state ST2 (Yes at Step S403), the controller 10 proceeds to the operation at Step S404. The controller 10 keeps the displayed state of the first display 2A (Step S404) and terminates the steps of the process illustrated in FIG. 12.

If it is determined that the second display 2B is not in the reflective state ST2 (No at Step S403), the controller 10 proceeds to the operation at Step S405. The controller 10 shifts the first display 2A from a displayed state to a hidden state (Step S405). The controller 10 performs a lock process (Step S406). The lock process includes for example a process to restrict reception of operation on the touch screen 2C, the button 3, or the like. The process to restrict reception of operation may be such that the controller 10 does not receive operation on the touch screen 2C or the controller 10 ignores received operation on the touch screen 2C. During the lock process, for example, the lock screen 41 is presented on the first display 2A, and the lock process is terminated when a user is authenticated. After the lock process is finished, the controller 10 terminates the steps of the process illustrated in FIG. 12.

FIG. 13 is a diagram that illustrates another example of the display control conducted by the smartphone 1 according to embodiments. As illustrated at Step S51 of FIG. 13, the smartphone 1 presents the home screen 40 on the first display 2A. At Step S51, if the condition for displaying the first image 50 is satisfied, the smartphone 1 presents the first image 50 on the second display 2B. If the condition for displaying the first image 50 is satisfied, the smartphone 1 presents the first image 50 at a predetermined area of the second display area 300 that is overlapped with part of the home screen 40 on the first display 2A. The smartphone 1 presents the first image 50 on the second display area 300 such that the first image 50 extends across the first area 301 and the second area 302 of the second display area 300.

Accordingly, the user is capable of viewing the home screen 40 presented on the first display 2A and the first image 50 presented on the second display 2B.

As illustrated at Step S52, if the first condition is satisfied, the smartphone 1 may shift the entire second display area 300 of the second display 2B, on which the first image 50 is not presented, from the transmissive state ST1 to the reflective state ST2 while presentation on the first display 2A is kept. The smartphone 1 is capable of masking the illuminance sensor 4, the proximity sensor 5, and the camera 12, which are provided on the front panel 22, with an area of the second display area 300 that has shifted to the reflective state ST2. As a result, the smartphone 1 may mask the contents presented on the first display 2A with the second display 2B and cause users to view only the first image 50 presented on the second display 2B. The smartphone 1 may cause users to view part of the second display 2B where the first image 50 is not presented, by using the color of the second display 2B that is in the reflective state ST2. Thus, the smartphone 1 may improve a range of variations for display forms.

FIG. 14 is a flowchart that illustrates another example of the steps of the process for the display control related to the second display 2B of the smartphone 1 according to embodiments. The steps of the process illustrated in FIG. 14 are performed when the controller 10 executes the control code 9A. The steps of the process illustrated in FIG. 14 are repeatedly performed by the controller 10.

As illustrated in FIG. 14, the controller 10 of the smartphone 1 presents the first image 50 on the second display 2B and shifts the area of the second display 2B where the first image 50 is not presented to the transmissive state ST1 (Step S501). After the operation at Step S501 is finished, the controller 10 proceeds to the operation at Step S502.

The controller 10 determines whether the first display 2A is in a displayed state (Step S502). If it is determined that the first display 2A is not in a displayed state (No at Step S502), the controller 10 terminates the steps of the process illustrated in FIG. 14. If it is determined that the first display 2A is in a displayed state (Yes at Step S502), the controller 10 proceeds to the operation at Step S503.

The controller 10 determines whether the first condition for the second display 2B is satisfied (Step S503). For example, the controller 10 determines that the first condition for the second display 2B is satisfied when a predetermined operation, a previously set time and date, or the like, is detected. If it is determined that the first condition for the second display 2B is not satisfied (No at Step S503), the controller 10 terminates the steps of the process illustrated in FIG. 14. If it is determined that the first condition for the second display 2B is satisfied (Yes at Step S503), the controller 10 proceeds to the operation at Step S504.

The controller 10 shifts the area of the second display 2B where the first image 50 is not presented from the transmissive state ST1 to the reflective state ST2 while presentation on the first display 2A and presentation of the first image 50 on the second display 2B are kept (Step S504). After the operation at Step S504 is finished, the controller 10 proceeds to the operation at Step S505.

The controller 10 determines whether the condition for canceling the reflective state ST2 of the second display 2B is satisfied (Step S505). For example, the controller 10 determines that the condition for canceling the reflective state ST2 is satisfied when the elapse of a cancellation time after a shift to the reflective state ST2, a predetermined cancellation operation, or the like, is detected. If it is determined that the condition for canceling the reflective state ST2 is not satisfied (No at Step S505), the controller 10 repeatedly performs the operation at Step S505, thereby keeping the reflective state ST2 of the second display 2B. If it is determined that the condition for canceling the reflective state ST2 is satisfied (Yes at Step S505), the controller 10 proceeds to the operation at Step S506.

The controller 10 shifts the area of the second display 2B where the first image 50 is not presented from the reflective state ST2 to the transmissive state ST1 while presentation on the first display 2A and presentation of the first image 50 on the second display 2B are kept (Step S506). After the operation at Step S506 is finished, the controller 10 terminates the steps of the process illustrated in FIG. 14.

Embodiments disclosed in the present application may be modified without departing from the scope and spirit of the disclosure. Furthermore, embodiments disclosed in the present application may be combined as appropriate. For example, embodiments may be modified as described below.

For example, each code illustrated in FIG. 5 may be divided into multiple modules or may be combined with other codes.

In embodiments, an explanation is given of a case where in the smartphone 1 the first image 50 extends across the first area 301 and the second area 302; however, the embodiments are not limited thereto. For example, the smartphone 1 may present an image on the second display 2B at any one of the first area 301 and the second area 302.

In embodiments, an explanation is given of a case where the smartphone 1 uses the second display 2B that is substantially rectangular; however, the embodiments are not limited thereto. For example, the smartphone 1 may use the second display 2B that is polygonal, oblong, star-shaped, or the like. In this case, the smartphone 1 may mask the first display 2A with the second display 2B that has a unique shape.

In embodiments, an explanation is given of a case where the smartphone 1 shifts the entire second display area 300 of the second display 2B from the transmissive state ST1 to the reflective state ST2 to mask the first display 2A; however, the embodiments are not limited thereto. For example, the smartphone 1 may present an image that has the reflective portion 52 of the first image 50 on the second display 2B so as to mask all or some of the first display 2A.

In embodiments, an explanation is given of a case where in the smartphone 1 the size of the touch screen 2C is substantially the same as the size of the first display 2A; however, the embodiments are not limited thereto. For example, in the smartphone 1, the size of the touch screen 2C may be substantially the same as the size of the second display 2B.

In embodiments, an explanation is given of a case where in the smartphone 1 the single second display 2B is laminated on the display surface side of the first display 2A; however, the embodiments are not limited thereto. For example, in the smartphone 1, multiple second displays may be laminated on the display surface side of the first display 2A.

In embodiments, an explanation is given of a case where in the smartphone 1 the second display 2B is provided on the front panel 22 of the housing 20; however, the embodiments are not limited thereto. For example, in the smartphone 1, the second display 2B may be further provided on the back face of the housing 20.

Figure 15A:
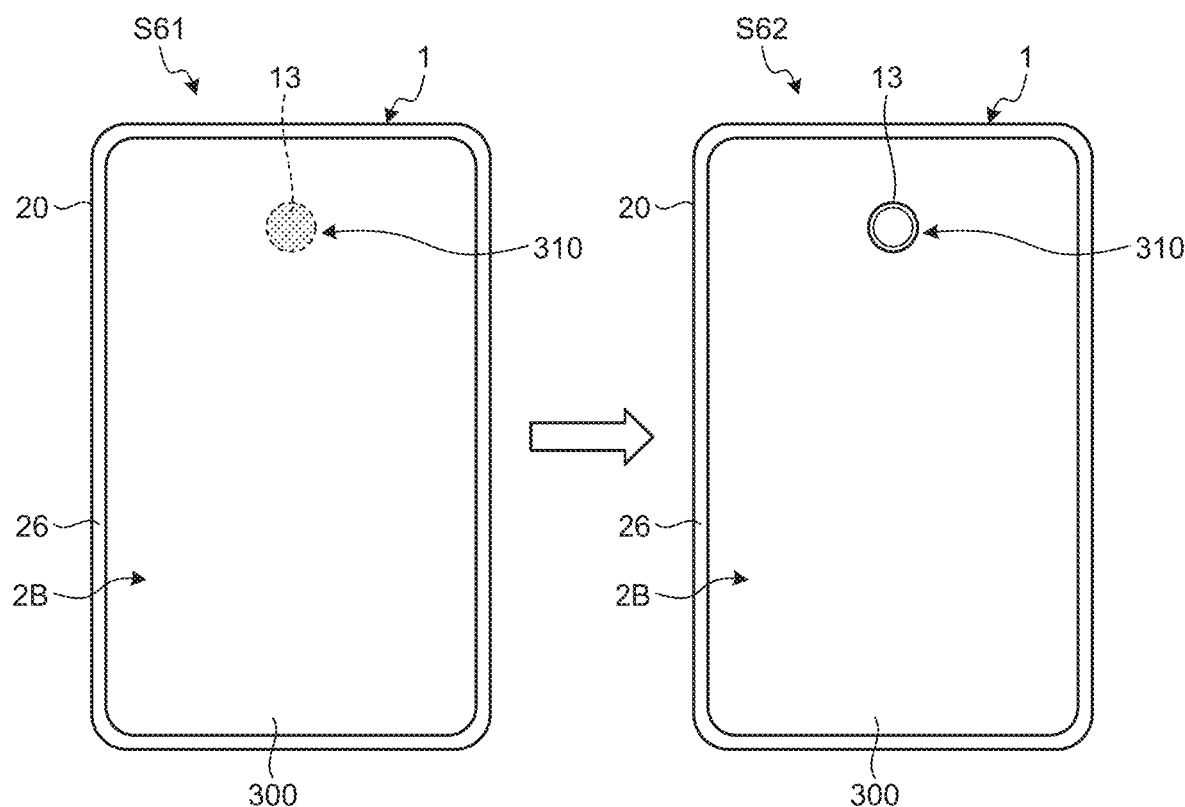
FIG. 15A is a diagram that illustrates an example of the display control on a back face, conducted by the smartphone according to embodiments.
Figure 15B:
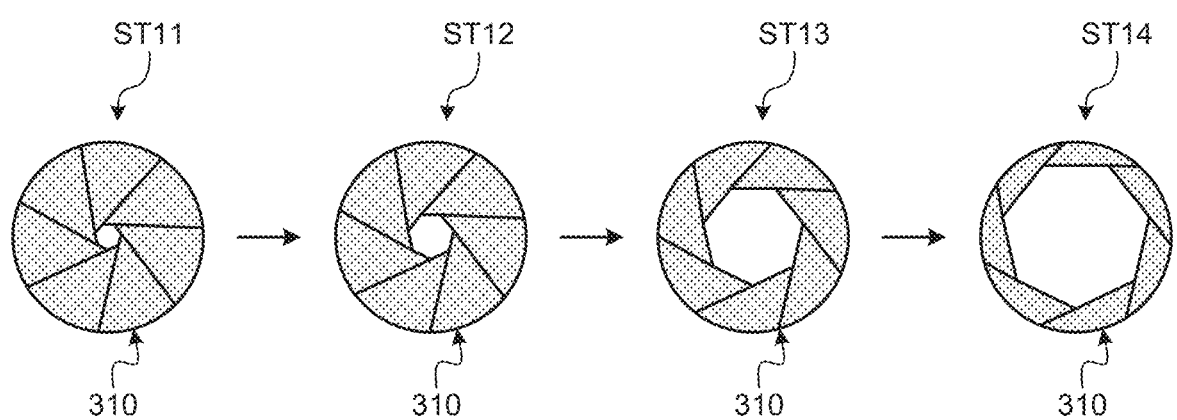
FIG. 15B is a diagram that illustrates an example of the display control for an area of a camera in FIG. 15A.

FIG. 15A is a diagram that illustrates an example of the display control on the back face, conducted by the smartphone 1 according to embodiments. FIG. 15B is a diagram that illustrates an example of the display control for an area of the camera 13 in FIG. 15A. As illustrated in FIG. 15A, in the smartphone 1, a back face 26 of the housing 20 is provided with the second display 2B. The back face 26 is opposite to the front surface of the smartphone 1. The second display 2B is overlapped with the entire back face 26 of the housing 20. In the smartphone 1, the back face 26 of the housing 20 is provided with the camera 13 that is an out-camera. The second display 2B covers the camera 13.

In the example illustrated at Step S61 of FIG. 15A, the smartphone 1 sets the entire surface of the second display 2B on the back face 26 to be in the reflective state ST2. The smartphone 1 reflects and scatters outer light so as to cause users to view the second display 2B on the back face 26 in white turbidity.

The second display 2B includes the second display area 300. The second display area 300 is an area that spreads over the entire back face 26 of the housing 20. The second display area 300 includes a part 310 of the second display 2B to cover the camera 13 on the back face 26. When the part 310 of the second display area 300 is in the reflective state ST2, the second display 2B may conceal the camera 13 from users. For example, as the part of the housing 20 where the camera 13 is provided is a camera hole, it is sometimes difficult for the second display 2B in the reflective state ST2 to fully mask the camera hole with white turbidity. That is, with the second display 2B in the reflective state ST2, the camera 13 is sometimes seen through at the part 310 and cannot be fully concealed from users. By providing more air gap between the camera 13 and the second display 2B, the smartphone 1 may make improvements so as not to cause the camera 13 to be seen through at the part 310 in the reflective state ST2.

At Step S61, the smartphone 1 sets the entire surface of the second display 2B on the back face 26 to be in the reflective state ST2, thereby masking the camera 13 with the second display 2B on the back face 26. For example, a user has activated a camera application of the smartphone 1.

At Step S62, after the camera application is activated, the smartphone 1 shifts the part 310 of the second display 2B from the reflective state ST2 to the transmissive state ST1. In the example illustrated in FIG. 15B, the smartphone 1 increases the percentage of the transmissive state ST1 for the part 310 of the second display 2B in order of states ST11, ST12, ST13, and ST14 like aperture blades of typical cameras. In this way, the smartphone 1 may mask the camera 13 with the second display 2B when it is not used, and stop masking the camera 13 with the second display 2B when it is in use. The smartphone 1 only needs to set the second display 2B on the back face 26 to be in the reflective state ST2; thus, power consumption of the second display 2B on the back face 26 may be reduced. As a result, the smartphone 1 uses the second display 2B on the back face 26 as a camera cover for the camera 13, whereby an increase in power consumption may be prevented and design of the back face 26 may be improved.

The control for masking the camera 13 with the second display 2B is applicable to the camera 12 on the principal surface 21 of the housing 20. For example, if the camera 12 on the principal surface 21 of the housing 20 is masked with the second display 2B, the smartphone 1 may shift only the part of the second display 2B covering the camera 12 from the reflective state ST2 to the transmissive state ST1.

In embodiments, an explanation is given of a case where in the smartphone 1 the second display 2B is provided on the entire back face 26 of the housing 20; however, the embodiments are not limited thereto. For example, in the smartphone 1, the second display 2B may be provided on part of the back face 26. In this case, the second display 2B may be provided at an area that includes at least the part that covers the camera 13 on the back face 26. Furthermore, in the reflective state ST2, the second display 2B may exhibit the color that is the same as or similar to the color of the back face 26 of the housing 20. Furthermore, in the smartphone 1, the first display 2A and the second display 2B may be overlapped with each other on the back face 26 of the housing 20.

In embodiments, an explanation is given of a case where the smartphone 1 causes the second display 2B to provide dot matrix displays; however, the embodiments are not limited thereto. The second display 2B may provide segment displays or combine matrix displays and segment displays.

Figure 16:
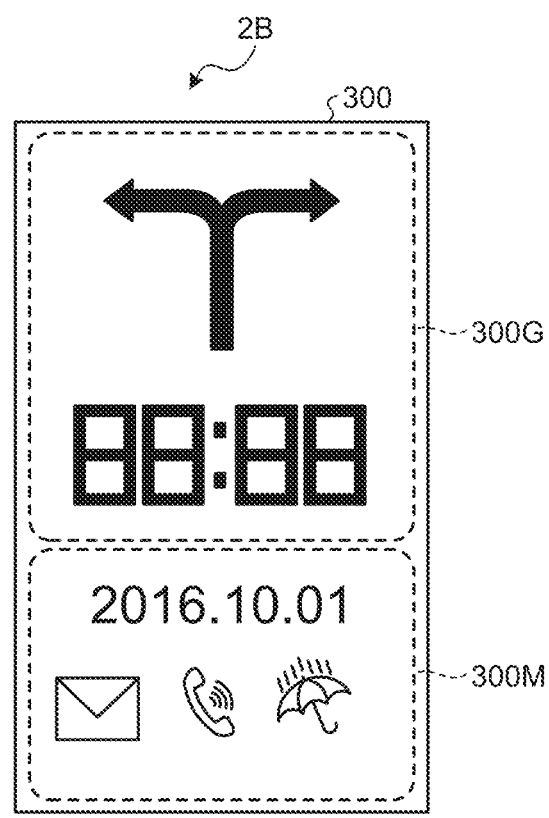
FIG. 16 is a diagram that illustrates another example of a second display area of the second display.

FIG. 16 is a diagram that illustrates another example of the second display area 300 of the second display 2B. As illustrated in FIG. 16, the second display area 300 of the second display 2B includes a segment area 300G and a matrix area 300M. The segment area 300G is capable of presenting a desired segment among predetermined segments. Examples of the segments include, but are not limited to, numbers, texts, symbols, etc. The segment area 300G is capable of presenting, for example, an arrow, a clock, or an indicator for distance/speed. The matrix area 300M may combine multiple dots (pixels) for display. The matrix area 300M is capable of presenting for example date, texts, or notification icons. The smartphone 1 needs to set only segment portions presented on the segment area 300G of the second display 2B to be in the transmissive state ST1, i.e., a state where a voltage is being applied; thus, power consumption may be reduced. Arrangement of the segment area 300G and the matrix area 300M on the second display area 300 of the second display 2B is not limited to the example illustrated in FIG. 16.

In embodiments, the smartphone 1 is explained as an example of the mobile electronic device; however, the mobile electronic device according to attached claims is not limited to the smartphone 1. The mobile electronic device according to attached claims may be electronic devices other than the smartphone 1. Examples of the electronic device include, but are not limited to, mobile phones, smartwatches, portable personal computers, head-mounted displays, digital cameras, media players, electronic book readers, navigators, game machines, etc.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile electronic device, comprising:
a first display configured to have a first display area;
a second display that is overlapped with a display surface side of the first display and configured to switch a transmissive state for transmitting incident light and a reflective state for reflecting incident light; and
a controller configured to control presentation on the first display and presentation on the second display,
wherein
the second display is configured to have a second display area including a first area that is overlapped with at least a part of the first display area and a second area that is not overlapped with the first display area, and
the first area of the second display area is an area that is overlapped with an entirety of the first display area.

2. The mobile electronic device according to claim 1, wherein the controller is configured to cause the second display area of the second display to present a first image that extends across the first area and the second area.

3. The mobile electronic device according to claim 2, wherein
the first image has a first portion at the transmissive state and a second portion at the reflective state,
when the first image is presented on the second display, the controller is configured to
mask presentation on a portion of the first display area of the first display, said portion of the first display area overlapping with the second portion of the first image, and
display presentation on a portion of the second display area in a display color of the portion of the first display area, said portion of the second display area overlapping the first portion of the first image.

4. The mobile electronic device according to claim 1, wherein when the first display is in a hidden state, the controller is configured to
cause the second display area to present a second image for decorating an external appearance of the mobile electronic device, the second image having a first portion at the transmissive state and a second portion at the reflective state, and
change densities of pixels in the first and second portions of the second image.

5. The mobile electronic device according to claim 4, wherein the transmissive state is a state where a background of the second image displayed on the second display is visible to a user of the mobile electronic device through the second display and includes a translucent state.

6. The mobile electronic device according to claim 1, wherein the second display is configured to be provided on a substantially entirety of a predetermined surface of the mobile electronic device.

7. The mobile electronic device according to claim 1, wherein the controller is configured to set an entirety of the first area of the second display to be in the reflective state while the first display remains in the displayed state.

8. The mobile electronic device according to claim 7, wherein when a predetermined condition is satisfied while the first display is in a displayed state, the controller is configured to
shift the first display from the displayed state to a hidden state, and
refrain from shifting the first display from the displayed state to the hidden state when the entirety of the first area of the second display is in the reflective state.

9. The mobile electronic device according to claim 8, further comprising a touch screen disposed on the first display in an overlapping manner and configured to detect a contact on the touch screen, wherein
when the entirety of the first area of the second display is in the reflective state, the controller is configured to
keep the first display in the displayed state, and
control the mobile electronic device according to the contact detected on the touch screen.

10. The mobile electronic device according to claim 1, wherein the first display area is defined by an entire display surface of the first display.

11. A control method implemented by a mobile electronic device that includes a first display that is configured to have a first display area; and a second display that is overlapped with a display surface side of the first display and configured to switch a transmissive state for transmitting incident light and a reflective state for reflecting incident light, the second display being configured to have a second display area that includes a first area that is overlapped with at least a part of the first display area and a second area that is not overlapped with the first display area, the control method comprising:
controlling presentation on the first display; and
causing the second display area of the second display to present a first image that extends across the first area and the second area,
wherein the first area of the second display area is an area that is overlapped with an entirety of the first display area.

12. A non-transitory storage medium that stores a control code for causing, when executed by a device that includes a first display that is configured to have a first display area; and a second display that is overlapped with a display surface side of the first display and configured to switch a transmissive state for transmitting incident light and a reflective state for reflecting incident light, the second display being configured to have a second display area that includes a first area that is overlapped with at least a part of the first display area and a second area that is not overlapped with the first display area, the device to execute
controlling presentation on the first display; and
causing the second display area of the second display to present a first image that extends across the first area and the second area,
wherein the first area of the second display area is an area that is overlapped with an entirety of the first display area.

13. A mobile electronic device, comprising:
a first display configured to have a first display area;
a second display that is overlapped with a display surface side of the first display and configured to switch a transmissive state for transmitting incident light and a reflective state for reflecting incident light; and
a controller configured to control presentation on the first display and presentation on the second display,
wherein
the second display is configured to have a second display area including a first area that is overlapped with at least a part of the first display area and a second area that is not overlapped with the first display area,
the controller is configured to cause the second display area of the second display to present a first image that extends across the first area and the second area,
the first image has a first portion at the transmissive state and a second portion at the reflective state,
when the first image is presented on the second display, the controller is configured to
mask presentation on a portion of the first display area of the first display, said portion of the first display area overlapping with the second portion of the first image, and
display presentation on a portion of the second display area in a display color of the portion of the first display area, said portion of the second display area overlapping the first portion of the first image.

14. The mobile electronic device according to claim 13, wherein the first image includes an image that indicates a boundary between the first image and presentation by the first display.

* * * * *